United States Patent
Silverbrook

(10) Patent No.: US 6,783,217 B2
(45) Date of Patent: Aug. 31, 2004

(54) MICRO-ELECTROMECHANICAL VALVE ASSEMBLY

(75) Inventor: Kia Silverbrook, Balmain (AU)

(73) Assignee: Silverbrook Research Pty Ltd, Balmain (AU)

( * ) Notice: Subject to any disclaimer, the term of this patent is extended or adjusted under 35 U.S.C. 154(b) by 0 days.

(21) Appl. No.: 10/693,947

(22) Filed: Oct. 28, 2003

(65) Prior Publication Data

US 2004/0085402 A1 May 6, 2004

Related U.S. Application Data

(63) Continuation of application No. 10/302,606, filed on Nov. 23, 2002, now Pat. No. 6,644,767.

(30) Foreign Application Priority Data

Jul. 15, 1997 (AU) .............................................. PO7991
Jul. 15, 1997 (AU) .............................................. PO8001

(51) Int. Cl.⁷ .............................................. B41J 2/175
(52) U.S. Cl. ...................................................... 347/85
(58) Field of Search .............................. 347/20, 48, 54, 347/56, 63, 65, 84, 85

(56) References Cited

U.S. PATENT DOCUMENTS

| | | | |
|---|---|---|---|
| 4,007,464 A | 2/1977 | Bassous et al. | |
| 4,423,401 A | 12/1983 | Mueller | |
| 4,458,255 A | 7/1984 | Giles | |
| 4,553,393 A | 11/1985 | Ruoff | |

(List continued on next page.)

FOREIGN PATENT DOCUMENTS

| | | |
|---|---|---|
| DE | 1 648 322 | 3/1971 |
| DE | 29 05 063 | 8/1980 |
| DE | 32 45 283 | 6/1984 |
| DE | 34 30 155 | 2/1986 |

(List continued on next page.)

OTHER PUBLICATIONS

Noworolski, J. Mark et al, "Process for in–plane and out-of-plane single–crystal–silicon thermal microactuators". Sensors and Actuators, A, CH, Elsevier Sequoia S.A., Lausanne, vol. 55, No. 1, Jul. 15, 1996, pp 65–69, XP004077979 ISSN: 0924-4247.

Ataka, Manabu et al, "Fabrication and Operation of Polymide Bimorph Actuators for Ciliary Motion System". Journal of Microelectromechanical Systems, US, IEEE Inc. New York, vol. 2, No. 4, Dec. 1, 1993, pp. 146–150, XP000443412, ISSN: 1057-7157.

(List continued on next page.)

Primary Examiner—Stephen D. Meier
Assistant Examiner—An H. Do

(57) ABSTRACT

A micro-electromechanical valve assembly includes an elongate actuator that is anchored at one end to the wafer substrate to be in electrical contact with the drive circuitry layers. A closure member is mounted on an opposite end of the elongate actuator. The actuator is configured to receive an electrical signal from the drive circuitry layer to displace the closure member between a closed position in which the closure member covers the fluid supply opening and ink is inhibited from flowing through the fluid supply channel and an open position. The elongate actuator is shaped so that, in a rest condition, the actuator encloses an arc. The actuator includes a heating portion that is capable of being heated on receipt of the electrical signal to expand. The heating portion is configured so that, when the portion is heated, the resultant expansion of the portion causes the actuator to straighten at least partially and a subsequent cooling of the portion causes the actuator to return to its rest condition thereby displacing the closure between the closed and open positions.

6 Claims, 9 Drawing Sheets

U.S. PATENT DOCUMENTS

| | | | |
|---|---|---|---|
| 4,672,398 A | | 6/1987 | Kuwabara et al. |
| 4,737,802 A | | 4/1988 | Mielke |
| 4,812,792 A | | 3/1989 | Leibowitz |
| 4,855,567 A | | 8/1989 | Mueller |
| 4,864,824 A | | 9/1989 | Gabriel et al. |
| 5,029,805 A | | 7/1991 | Albarda et al. |
| 5,058,856 A | * | 10/1991 | Gordon et al. ................. 251/11 |
| 5,255,016 A | * | 10/1993 | Usui et al. ..................... 347/71 |
| 5,258,774 A | | 11/1993 | Rogers |
| 5,612,723 A | | 3/1997 | Shimura et al. |
| 5,666,141 A | | 9/1997 | Matoba et al. |
| 5,719,604 A | | 2/1998 | Inui et al. |
| 5,812,159 A | | 9/1998 | Anagnostopoulos et al. |
| 5,828,394 A | * | 10/1998 | Khuri-Yakub et al. ........ 347/72 |
| 6,003,977 A | * | 12/1999 | Weber et al. .................. 347/63 |
| 6,062,681 A | * | 5/2000 | Field et al. .................... 347/65 |
| 6,174,050 B1 | | 1/2001 | Kashino et al. |
| 6,485,123 B2 | | 11/2002 | Silverbrook |

FOREIGN PATENT DOCUMENTS

| | | |
|---|---|---|
| DE | 37 16 996 | 12/1988 |
| DE | 39 34 280 | 4/1990 |
| DE | 43 28 433 | 3/1995 |
| DE | 195 16 997 | 11/1995 |
| DE | 195 17 969 | 11/1995 |
| DE | 195 32 913 | 3/1996 |
| DE | 196 23 620 A1 | 12/1996 |
| DE | 196 39 717 | 4/1997 |
| EP | 0 092 229 | 10/1983 |
| EP | 0 398 031 | 11/1990 |
| EP | 0 427 291 | 5/1991 |
| EP | 0 431 338 | 6/1991 |
| EP | 0 478 956 | 4/1992 |
| EP | 0 506 232 | 9/1992 |
| EP | 0 510 648 | 10/1992 |
| EP | 0 627 314 | 12/1994 |
| EP | 0 634 273 | 1/1995 |
| EP | 0 713 774 A2 | 5/1996 |
| EP | 0 737 580 | 10/1996 |
| EP | 0 750 993 | 1/1997 |
| EP | 0 882 590 | 12/1998 |
| FR | 2 231 076 | 12/1974 |
| GB | 792 145 | 3/1958 |
| GB | 1 428 239 | 3/1976 |
| GB | 2 262 152 | 6/1993 |
| JP | 58 112747 | 7/1983 |
| JP | 58 116165 | 7/1983 |
| JP | 61 025849 | 2/1986 |
| JP | 61 268453 | 11/1986 |
| JP | 01 105746 | 4/1989 |
| JP | 01 115639 | 5/1989 |
| JP | 01 128839 | 5/1989 |
| JP | 01 257058 | 10/1989 |
| JP | 01 306254 | 12/1989 |
| JP | 02 050841 | 2/1990 |
| JP | 2 92643 | 4/1990 |
| JP | 2 108544 | 4/1990 |
| JP | 02 158348 | 6/1990 |
| JP | 02 162049 | 6/1990 |
| JP | 2 265752 | 10/1990 |
| JP | 03 653348 | 3/1991 |
| JP | 03 112662 | 5/1991 |
| JP | 03 180350 | 8/1991 |
| JP | 04 118241 | 4/1992 |
| JP | 04 126255 | 4/1992 |
| JP | 04 141429 | 5/1992 |
| JP | 4 353458 | 12/1992 |
| JP | 04 368851 | 12/1992 |
| JP | 05 28765 | 10/1993 |
| JP | 05 318724 | 12/1993 |
| JP | 6 91865 | 4/1994 |
| JP | 6 91866 | 4/1994 |
| JP | 07 314665 | 12/1995 |
| WO | WO 94 18010 | 8/1994 |
| WO | WO 97 12689 | 4/1997 |

OTHER PUBLICATIONS

Yamagata, Yutaka et al, "A Micro Mobile Mechanism Using Thermal Expansion and its Theoretical Analysis", Proceedings of the workshop on micro electro mechanical systems (MEMS), US, New York, IEEE, vol. Workshop 7, Jan. 25, 1994, pp 142–147, XP000528408, ISBN: 0 7803 1834 X.

* cited by examiner

MICRO-ELECTROMECHANICAL VALVE ASSEMBLY

Continuation application on 10/302,606 filed Nov. 23, 2002 now U.S. Pat. No. 6,644,767.

CROSS REFERENCES TO RELATED APPLICATIONS

The following Australian provisional patent applications are hereby incorporated by reference. For the purposes of location and identification, U.S. patents/patent applications identified by their U.S. patent/patent application serial numbers are listed alongside the Australian applications from which the U.S. patents/patent applications claim the right of priority.

| CROSS-REFERENCED AUSTRALIAN PROVISIONAL PATENT APPLICATION NO. | US PATENT/PATENT APPLICATION (CLAIMING RIGHT OF PRIORITY FROM AUSTRALIAN PROVISIONAL APPLICATION) | DOCKET NO. |
|---|---|---|
| PO7991 | 09/113,060 | ART01 |
| PO8505 | 6,476,863 | ART02 |
| PO7988 | 09/113,073 | ART03 |
| PO9395 | 6,322,181 | ART04 |
| PO8017 | 09/112,747 | ART06 |
| PO8014 | 6,227,648 | ART07 |
| PO8025 | 09/112,750 | ART08 |
| PO8032 | 09/112,746 | ART09 |
| PO7999 | 09/112,743 | ART10 |
| PO7998 | 09/112,742 | ART11 |
| PO8031 | 09/112,741 | ART12 |
| PO8030 | 6,196,541 | ART13 |
| PO7997 | 6,195,150 | ART15 |
| PO7979 | 6,362,868 | ART16 |
| PO8015 | 09/112,738 | ART17 |
| PO7978 | 09/113,067 | ART18 |
| PO7982 | 6,431,669 | ART19 |
| PO7989 | 6,362,869 | ART20 |
| PO8019 | 6,472,052 | ART21 |
| PO7980 | 6,356,715 | ART22 |
| PO8018 | 09/112,777 | ART24 |
| PO7938 | 09/113,224 | ART25 |
| PO8016 | 6,366,693 | ART26 |
| PO8024 | 6,329,990 | ART27 |
| PO7940 | 09/113,072 | ART28 |
| PO7939 | 6,459,495 | ART29 |
| PO8501 | 6,137,500 | ART30 |
| PO8500 | 09/112,796 | ART31 |
| PO7987 | 09/113,071 | ART32 |
| PO8022 | 6,398,328 | ART33 |
| PO8497 | 09/113,090 | ART34 |
| PO8020 | 6,431,704 | ART38 |
| PO8023 | 09/113,222 | ART39 |
| PO8504 | 09/112,786 | ART42 |
| PO8000 | 6,415,054 | ART43 |
| PO7977 | 09/112,782 | ART44 |
| PO7934 | 09/113,056 | ART45 |
| PO7990 | 09/113,059 | ART46 |
| PO8499 | 6,486,886 | ART47 |
| PO8502 | 6,381,361 | ART48 |
| PO7981 | 6,317,192 | ART50 |
| PO7986 | 09/113,057 | ART51 |
| PO7983 | 09/113,054 | ART52 |
| PO8026 | 09/112,752 | ART53 |
| PO8027 | 09/112,759 | ART54 |
| PO8028 | 09/112,757 | ART56 |
| PO9394 | 6,357,135 | ART57 |
| PO9396 | 09/113,107 | ART58 |
| PO9397 | 6,271,931 | ART59 |
| PO9398 | 6,353,772 | ART60 |
| PO9399 | 6,106,147 | ART61 |
| PO9400 | 09/112,790 | ART62 |
| PO9401 | 6,304,291 | ART63 |
| PO9402 | 09/112,788 | ART64 |
| PO9403 | 6,305,770 | ART65 |
| PO9405 | 6,289,262 | ART66 |
| PP0959 | 6,315,200 | ART68 |
| PP1397 | 6,217,165 | ART69 |
| PP2370 | 09/112,781 | DOT01 |
| PP2371 | 09/113,052 | DOT02 |
| PO8003 | 6,350,023 | Fluid01 |
| PO8005 | 6,318,849 | Fluid02 |
| PO9404 | 09/113,101 | Fluid03 |
| PO8066 | 6,227,652 | IJ01 |
| PO8072 | 6,213,588 | IJ02 |
| PO8040 | 6,213,589 | IJ03 |
| PO8071 | 6,231,163 | IJ04 |
| PO8047 | 6,247,795 | IJ05 |
| PO8035 | 6,394,581 | IJ06 |
| PO8044 | 6,244,691 | IJ07 |
| PO8063 | 6,257,704 | IJ08 |
| PO8057 | 6,416,168 | IJ09 |
| PO8056 | 6,220,694 | IJ10 |
| PO8069 | 6,257,705 | IJ11 |
| PO8049 | 6,247,794 | IJ12 |
| PO8036 | 6,234,610 | IJ13 |
| PO8048 | 6,247,793 | IJ14 |
| PO8070 | 6,264,306 | IJ15 |
| PO8067 | 6,241,342 | IJ16 |
| PO8001 | 6,247,792 | IJ17 |
| PO8038 | 6,264,307 | IJ18 |
| PO8033 | 6,254,220 | IJ19 |
| PO8002 | 6,234,611 | IJ20 |
| PO8068 | 6,302,528 | IJ21 |
| PO8062 | 6,283,582 | IJ22 |
| PO8034 | 6,239,821 | IJ23 |
| PO8039 | 6,338,547 | IJ24 |
| PO8041 | 6,247,796 | IJ25 |
| PO8004 | 09/113,122 | IJ26 |
| PO8037 | 6,390,603 | IJ27 |
| PO8043 | 6,362,843 | IJ28 |
| PO8042 | 6,293,653 | IJ29 |
| PO8064 | 6,312,107 | IJ30 |
| PO9389 | 6,227,653 | IJ31 |
| PO9391 | 6,234,609 | IJ32 |
| PP0888 | 6,238,040 | IJ33 |
| PP0891 | 6,188,415 | IJ34 |
| PP0890 | 6,227,654 | IJ35 |
| PP0873 | 6,209,989 | IJ36 |
| PP0993 | 6,247,791 | IJ37 |
| PP0890 | 6,336,710 | IJ38 |
| PP1398 | 6,217,153 | IJ39 |
| PP2592 | 6,416,167 | IJ40 |
| PP2593 | 6,243,113 | IJ41 |
| PP3991 | 6,283,581 | IJ42 |
| PP3987 | 6,247,790 | IJ43 |
| PP3985 | 6,260,953 | IJ44 |
| PP3983 | 6,267,469 | IJ45 |
| PO7935 | 6,224,780 | IJM01 |
| PO7936 | 6,235,212 | IJM02 |
| PO7937 | 6,280,643 | IJM03 |
| PO8061 | 6,284,147 | IJM04 |
| PO8054 | 6,214,244 | IJM05 |
| PO8065 | 6,071,750 | IJM06 |
| PO8055 | 6,267,905 | IJM07 |
| PO8053 | 6,251,298 | IJM08 |
| PO8078 | 6,258,285 | IJM09 |
| PO7933 | 6,225,138 | IJM10 |
| PO7950 | 6,241,904 | IJM11 |
| PO7949 | 6,299,786 | IJM12 |
| PO8060 | 09/113,124 | IJM13 |
| PO8059 | 6,231,773 | IJM14 |
| PO8073 | 6,190,931 | IJM15 |
| PO8076 | 6,248,249 | IJM16 |
| PO8075 | 09/113,120 | IJM17 |
| PO8079 | 6,241,906 | IJM18 |

-continued

| CROSS-REFERENCED AUSTRALIAN PROVISIONAL PATENT APPLICATION NO. | US PATENT/PATENT APPLICATION (CLAIMING RIGHT OF PRIORITY FROM AUSTRALIAN PROVISIONAL APPLICATION) | DOCKET NO. |
|---|---|---|
| PO8050 | 09/113,116 | IJM19 |
| PO8052 | 6,241,905 | IJM20 |
| PO7948 | 09/113,117 | IJM21 |
| PO7951 | 6,231,772 | IJM22 |
| PO8074 | 6,274,056 | IJM23 |
| PO7941 | 6,290,861 | IJM24 |
| PO8077 | 6,248,248 | IJM25 |
| PO8058 | 6,306,671 | IJM26 |
| PO8051 | 6,331,258 | IJM27 |
| PO8045 | 6,110,754 | IJM28 |
| PO7952 | 6,294,101 | IJM29 |
| PO8046 | 6,416,679 | IJM30 |
| PO9390 | 6,264,849 | IJM31 |
| PO9392 | 6,254,793 | IJM32 |
| PP0889 | 6,235,211 | IJM35 |
| PP0887 | 6,491,833 | IJM36 |
| PP0882 | 6,264,850 | IJM37 |
| PP0874 | 6,258,284 | IJM38 |
| PP1396 | 6,312,615 | IJM39 |
| PP3989 | 6,228,668 | IJM40 |
| PP2591 | 6,180,427 | IJM41 |
| PP3990 | 6,171,875 | IJM42 |
| PP3986 | 6,267,904 | IJM43 |
| PP3984 | 6,245,247 | IJM44 |
| PP3982 | 6,315,914 | IJM45 |
| PP0895 | 6,231,148 | IR01 |
| PP0870 | 09/113,106 | IR02 |
| PP0869 | 6,293,658 | IR04 |
| PP0887 | 09/113,104 | IR05 |
| PP0885 | 6,238,033 | IR06 |
| PP0884 | 6,312,070 | IR10 |
| PP0886 | 6,238,111 | IR12 |
| PP0871 | 09/113,086 | IR13 |
| PP0876 | 09/113,094 | IR14 |
| PP0877 | 6,378,970 | IR16 |
| PP0878 | 6,196,739 | IR17 |
| PP0879 | 09/112,774 | IR18 |
| PP0883 | 6,270,182 | IR19 |
| PP0880 | 6,152,619 | IR20 |
| PP0881 | 09/113,092 | IR21 |
| PO8006 | 6,087,638 | MEMS02 |
| PO8007 | 6,340,222 | MEMS03 |
| PO8008 | 09/113,062 | MEMS04 |
| PO8010 | 6,041,600 | MEMS05 |
| PO8011 | 6,299,300 | MEMS06 |
| PO7947 | 6,067,797 | MEMS07 |
| PO7944 | 6,286,935 | MEMS09 |
| PO7946 | 6,044,646 | MEMS10 |
| PO9393 | 09/113,065 | MEMS11 |
| PP0875 | 09/113,078 | MEMS12 |
| PP0894 | 6,382,769 | MEMS13 |

STATEMENT REGARDING FEDERALLY SPONSORED RESEARCH OR DEVELOPMENT

Not applicable.

FIELD OF THE INVENTION

The present invention relates to a micro-electromechanical valve assembly.

BACKGROUND OF THE INVENTION

Many different types of printing have been invented, a large number of which are presently in use. The known forms of print have a variety of methods for marking the print media with a relevant marking media. Commonly used forms of printing include offset printing, laser printing and copying devices, dot matrix type impact printers, thermal paper printers, film recorders, thermal wax printers, dye sublimation printers and inkjet printers both of the drop on demand and continuous flow type. Each type of printer has its own advantages and problems when considering cost, speed, quality, reliability, simplicity of construction and operation etc.

In recent years, the field of ink jet printing, wherein each individual pixel of ink is derived from one or more ink nozzles has become increasingly popular primarily due to its inexpensive and versatile nature.

Many different techniques on ink jet printing have been invented. For a survey of the field, reference is made to an article by J Moore, "Non-Impact Printing: Introduction and Historical Perspective", Output Hard Copy Devices, Editors R Dubeck and S Sherr, pages 207–220 (1988).

Ink Jet printers themselves come in many different types. The utilisation of a continuous stream ink in ink jet printing appears to date back to at least 1929 wherein U.S. Pat. No. 1,941,001 by Hansell discloses a simple form of continuous stream electro-static ink jet printing.

U.S. Pat. No. 3,596,275 by Sweet also discloses a process of a continuous inkjet printing including the step wherein the inkjet stream is modulated by a high frequency electro-static field so as to cause drop separation. This technique is still used by several manufacturers including Elmjet and Scitex (see also U.S. Pat. No. 3,373,437 by Sweet et al)

Piezoelectric inkjet printers are also one form of commonly used inkjet printing device. Piezoelectric systems are disclosed by Kyser et. al. in U.S. Pat. No. 3,946,398 (1970) which discloses a diaphragm mode of operation, by Zolten in U.S. Pat. 3,683,212 (1970) which discloses a squeeze mode of operation of a piezoelectric crystal, Stemme in U.S. Pat. No. 3,747,120 (1972) which discloses a bend mode of piezoelectric operation, Howkins in U.S. Pat. No. 4,459,601 which discloses a piezoelectric push mode actuation of the ink jet stream and Fischbeck in U.S. Pat. No. 4,584,590 which discloses a shear mode type of piezoelectric transducer element.

Recently, thermal ink jet printing has become an extremely popular form of ink jet printing. The ink jet printing techniques include those disclosed by Endo et al in GB 2007162 (1979) and Vaught et al in U.S. Pat. 4,490,728. Both the aforementioned references disclose ink jet printing techniques rely upon the activation of an electrothermal actuator which results in the creation of a bubble in a constricted space, such as a nozzle, which thereby causes the ejection of ink from an aperture connected to the confined space onto a relevant print media. Printing devices using the electrothermal actuator are manufactured by manufacturers such as Canon and Hewlett Packard.

As can be seen from the foregoing, many different types of printing technologies are available. Ideally, a printing technology should have a number of desirable attributes. These include inexpensive construction and operation, high speed operation, safe and continuous long term operation etc. Each technology may have its own advantages and disadvantages in the areas of cost, speed, quality, reliability, power usage, simplicity of construction operation, durability and consumables.

The valve assembly that forms the basis of this invention facilitates the achievement of a number of the desirable attributes listed above.

SUMMARY OF THE INVENTION

According to a first aspect of the invention, there is provided a micro-electromechanical valve assembly for controlling a flow of fluid through a fluid supply channel defined in a wafer substrate and drive circuitry layers positioned on the wafer substrate and terminating at a fluid supply opening, the valve assembly comprising;

an elongate actuator that is anchored at one end to the wafer substrate to be in electrical contact with the drive circuitry layers; and a closure member that is mounted on an opposite end of the elongate actuator, the actuator being configured to receive an electrical signal from the drive circuitry layer to displace the closure member between a closed position in which the closure member covers the fluid supply opening and ink is inhibited from flowing through the fluid supply channel and an open position, wherein the elongate actuator is shaped so that, in a rest condition, the actuator encloses an arc, the actuator including a heating portion that is capable of being heated on receipt of the electrical signal to expand, the heating portion being configured so that, when the portion is heated, the resultant expansion of the portion causes the actuator to straighten at least partially and a subsequent cooling of the portion causes the actuator to return to its rest condition thereby displacing the closure between the closed and open positions.

Each actuator may include a body portion that is of a resiliently flexible material having a coefficient of thermal expansion which is such that the material can expand to perform work when heated, the heating portion being positioned in the body portion and defining a heating circuit of a suitable metal.

The heating circuit may include a heater and a return trace, the heater being positioned proximate an inside edge of the body portion and the return trace being positioned outwardly of the heater, so that an inside region of the body portion is heated to a relatively greater extent with the result that the inside region expands to a greater extent than a remainder of the body portion.

A serpentine length of said suitable material may define the heater.

The body portion may be of polytetrafluoroethylene and the heating circuit may be of copper Each actuator may define a coil that partially uncoils when the heating portion expands.

In accordance with a second aspect of the present invention, there is provided an inkjet nozzle comprising an ink ejection port for the ejection of ink, an ink supply with an oscillating ink pressure interconnected to the ink ejection port, a shutter mechanism interconnected between the ink supply and the ink ejection port, which blocks the ink ejection port, and an actuator mechanism for moving the shutter mechanism on demand away from the ink ejection port so as to allow for the ejection of ink on demand from the ink ejection port.

In another embodiment of the invention, there is provided a method of operating an ink jet printhead that includes a plurality of nozzle arrangements and an ink reservoir, each nozzle arrangement having:

a nozzle chamber and an ink ejection port in fluid communication with the nozzle chamber, and a closure that is operatively positioned with respect to the ink ejection port, the closure being displaceable between open and closed positions to open and close the ink ejection port, respectively, the ink reservoir in fluid communication with the nozzle chambers, the method comprising the steps of:

maintaining each closure in the closed position;

subjecting ink in the ink reservoir and thus each nozzle chamber to an oscillating pressure, selectively and independently displacing each closure into the open position so that an ink droplet is ejected from the respective ink ejection port as a result of the oscillating pressure.

Further, the actuator preferably comprises a thermal actuator which is activated by the heating of one side of the actuator. Preferably the actuator has a coiled form and is uncoiled upon heating. The actuator includes a serpentine heater element encased in a material having a high coefficient of thermal expansion. The serpentine heater concertinas upon heating. Advantageously, the actuator includes a thick return trace for the serpentine heater element. The material in which the serpentine heater element is encased comprises polytetrafluoroethylene. The actuator is formed within a nozzle chamber which is formed on a silicon wafer and ink is supplied to the ejection port through channels etched through the silicon wafer.

BRIEF DESCRIPTION OF THE DRAWINGS

Notwithstanding any other forms which may fall within the scope of the present invention, preferred forms of the invention will now be described, by way of example only, with reference to the accompanying drawings in which.

DESCRIPTION OF PREFERRED AND OTHER EMBODIMENTS

In the preferred embodiment, an oscillating ink reservoir pressure is used to eject ink from ejection nozzles. Each nozzle has an associated shutter which normally blocks the nozzle. The shutter is moved away from the nozzle by an actuator whenever an ink drop is to be fired.

Figure 1:
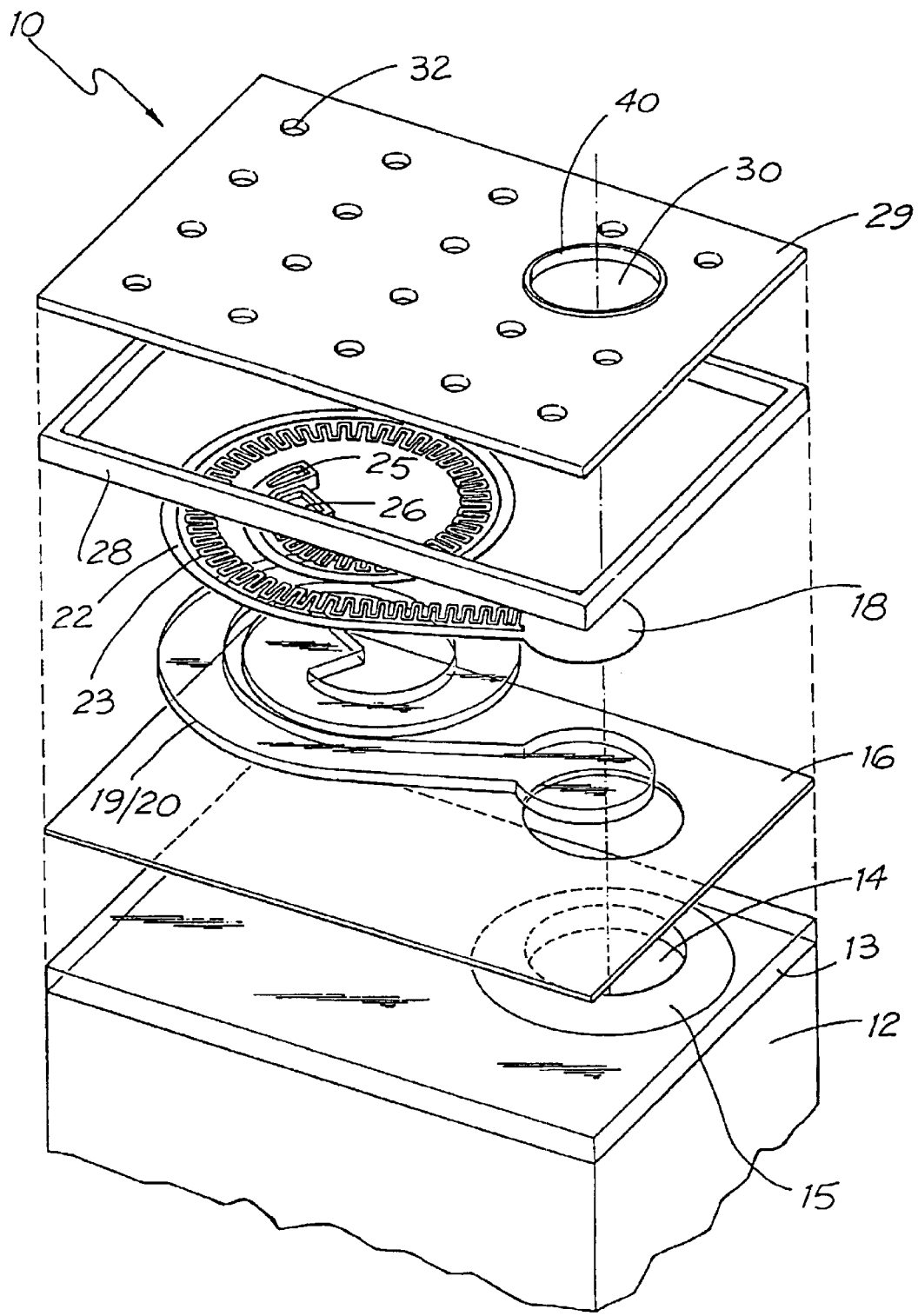
FIG. 1 is an exploded perspective view illustrating the construction of a single ink jet nozzle in accordance with the preferred embodiment.

Turning initially to FIG. 1, there is illustrated in exploded perspective a single ink jet nozzle 10 as constructed in accordance with the principles of the present invention. The exploded perspective illustrates a single ink jet nozzle 10. Ideally, the nozzles are formed as an array on a silicon wafer 12. The silicon wafer 12 is processed so as to have two level metal CMOS circuitry which includes metal layers and glass layers 13 and which are planarised after construction. The CMOS metal layer has a reduced aperture 14 for the access of ink from the back of silicon wafer 12 via an ink supply channel 15.

A bottom nitride layer 16 is constructed on top of the CMOS layer 13 so as to cover, protect and passivate the CMOS layer 13 from subsequent etching processes. Subsequently, there is provided a copper heater layer 18 which is sandwiched between two polytetrafluoroethylene (PTFE) layers 19,20. The copper layer 18 is connected to lower CMOS layer 13 through vias 25,26. The copper layer 18 and PTFE layers 19,20 are encapsulated within nitride borders e.g. 28 and nitride top layer 29 which includes an ink ejection port 30 in addition to a number of sacrificial etched access holes 32 which are of a smaller dimension than the ejection port 30 and are provided for allowing access of a etchant to lower sacrificial layers thereby allowing the use of the etchant in the construction of layers, 18,19,20 and 28.

Figure 2:
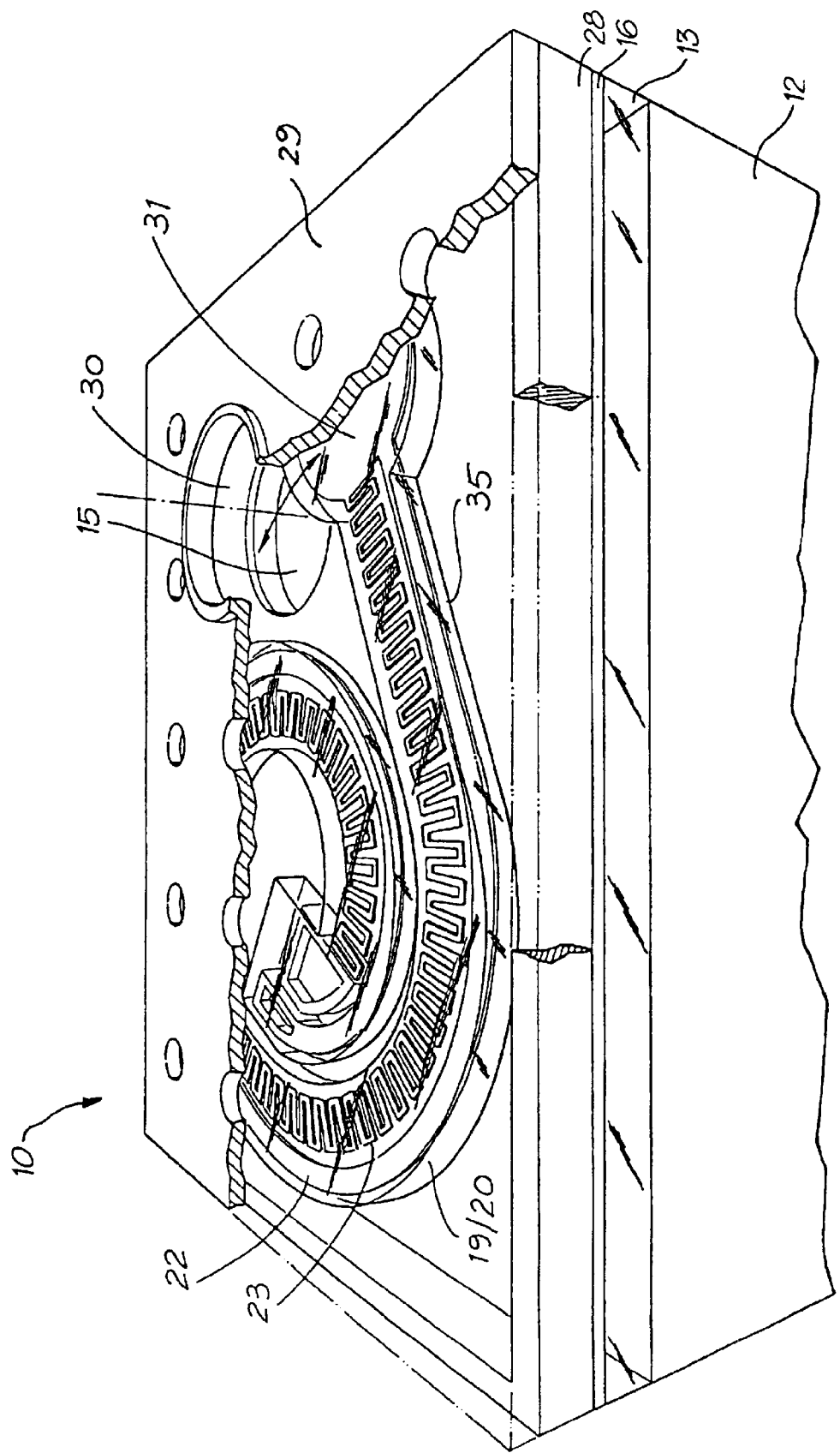
FIG. 2 is a perspective view, partly in section, of a single ink jet nozzle constructed in accordance with the preferred embodiment.

Turning now to FIG. 2, there is shown a cutaway perspective view of a fully constructed ink jet nozzle 10. The ink jet nozzle uses an oscillating ink pressure to eject ink from ejection port 30. Each nozzle has an associated shutter 31 which normally blocks it. The shutter 31 is moved away from the ejection port 30 by an actuator 35 whenever an ink drop is to be fired.

The ports 30 are in communication with ink chambers which contain the actuators 35. These chambers are connected to ink supply channels 15 which are etched through the silicon wafer. The ink supply channels 15 are substantially wider than the ports 30, to reduce the fluidic resistance to the ink pressure wave. The ink channels 15 are connected to an ink reservoir. An ultrasonic transducer (for example, a piezoelectric transducer) is positioned in the reservoir. The transducer oscillates the ink pressure at approximately 100 KHz. The ink pressure oscillation is sufficient that ink drops would be ejected from the nozzle were it not blocked by the shutter 31.

The shutters are moved by a thermoelastic actuator 35. The actuators are formed as a coiled serpentine copper heater 23 embedded in polytetrafluoroethylene (PTFE) 19/20. PTFE has a very high coefficient of thermal expansion (approximately $770 \times 10^{-6}$). The current return trace 22 from the heater 23 is also embedded in the PTFE actuator 35, current return trace 22 is made wider than the heater trace 23 and is not serpentine. Therefore, it does not heat the PTFE as much as the serpentine heater 23 does. The serpentine heater 23 is positioned along the inside edge of the PTFE coil, and the return trace is positioned on the outside edge. When actuated, the inside edge becomes hotter than the outside edge, and expands more. This results in the actuator 35 uncoiling.

The heater layer 23 is etched in a serpentine manner both to increase its resistance, and to reduce its effective tensile strength along the length of the actuator. This is so that the low thermal expansion of the copper does not prevent the actuator from expanding according to the high thermal expansion characteristics of the PTFE.

By varying the power applied to the actuator 35, the shutter 31 can be positioned between the fully on and fully off positions. This may be used to vary the volume of the ejected drop. Drop volume control may be used either to implement a degree of continuous tone operation, to regulate the drop volume, or both.

When data signals distributed on the printhead indicate that a particular nozzle is turned on, the actuator 35 is energized, which moves the shutter 31 so that it is not blocking the ink chamber. The peak of the ink pressure variation causes the ink to be squirted out of the nozzle 30. As the ink pressure goes negative, ink is drawn back into the nozzle, causing drop break-off. The shutter 31 is kept open until the nozzle is refilled on the next positive pressure cycle. It is then shut to prevent the ink from being withdrawn from the nozzle on the next negative pressure cycle.

Each drop ejection takes two ink pressure cycles. Preferably half of the nozzles 10 should eject drops in one phase, and the other half of the nozzles should eject drops in the other phase. This minimises the pressure variations which occur due to a large number of nozzles being actuated.

Referring to FIGS. 17 to 20, the operation of the printhead is described in greater detail. The printhead comprises an array of nozzle arrangements or nozzles 10, two of which are shown as 10.1 and 10.2 in FIG. 17. Each nozzle arrangement 10 has a chamber 58 in which its associated shutter 31 is arranged.

Each chamber 58 is in communication with an ink reservoir 60 via an ink supply channel 36. An ultrasonic transducer in the form of a piezoelectric transducer 62 is arranged n the ink reservoir 60.

As described above, each ink drop ejection takes two ink pressure cycles. The two ink pressure cycles are referred to as a phase. Half of the nozzles 10 should eject ink drops 64 (FIG. 18) in one phase with the other half of the nozzles ejecting ink drops in the other phase.

Figure 17:
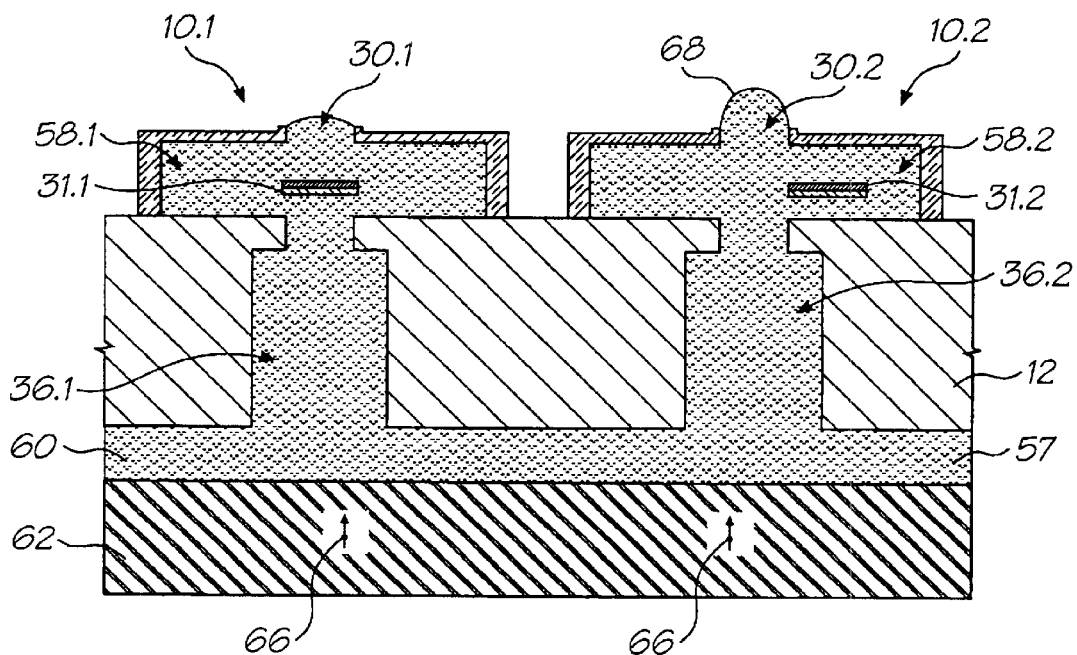
FIG. 17 shows a schematic, sectional end view of part of an ink jet nozzle array showing two nozzle arrangements of the array.

Consequently, as shown in FIG. 17 of the drawings, the shutter 31.2 of the nozzle 10.2 is in an open position while the shutter 31.1 of the nozzle 10.1 is in its closed position. It will be appreciated that the nozzle 10.2 represents a open nozzles of the array of the printhead while the nozzle 10.1 represents all the closed nozzles of the array of the printhead.

Figure 18:
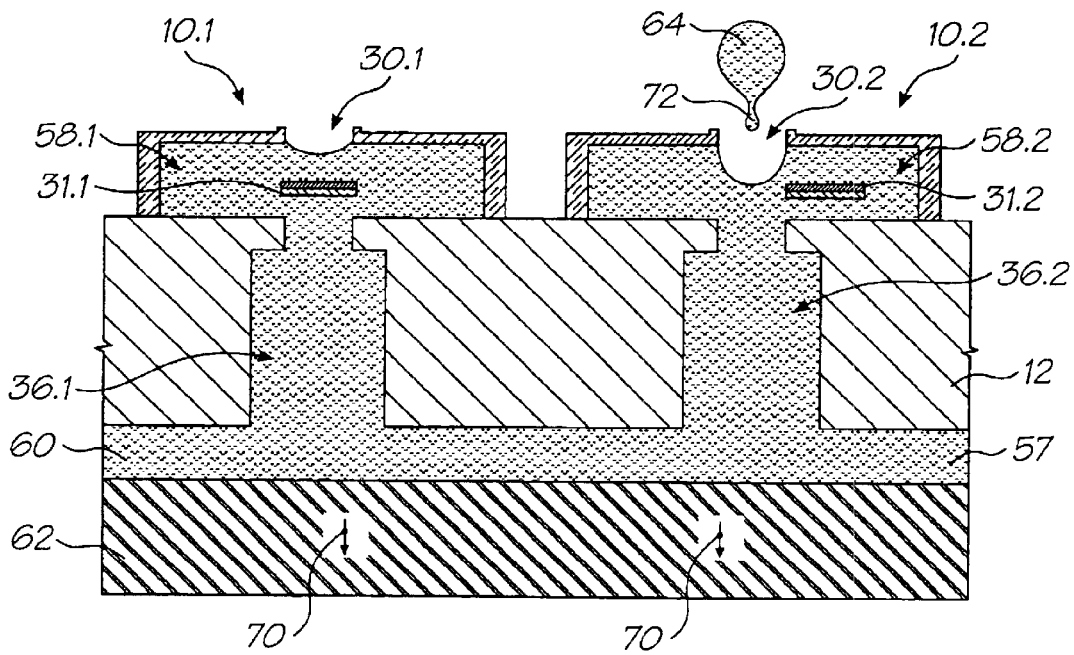
FIG. 18 shows the array with ink being ejected from one of the nozzle arrangements.

In a first pressure cycle, the transducer 62 is displaced in the direction of arrows 66 imparting positive pressure to the ink 57 in the reservoir 60 and, via the channels 36, the chambers 58 of the nozzles 10. Due to the fact that 31.2 of the nozzle 10.2 is open, ink in the ink ejection port 30.2 bulges outwardly as shown by the meniscus 68. After predetermined interval, the transducer 62 reverses direction to move in the direction of arrows 70 as shown in FIG. 18 of the drawings. This causes necking, as shown at 72, resulting in separation of the ink drop 64 due to a first negative going pressure cycle imparted to the ink 57.

Figure 19:
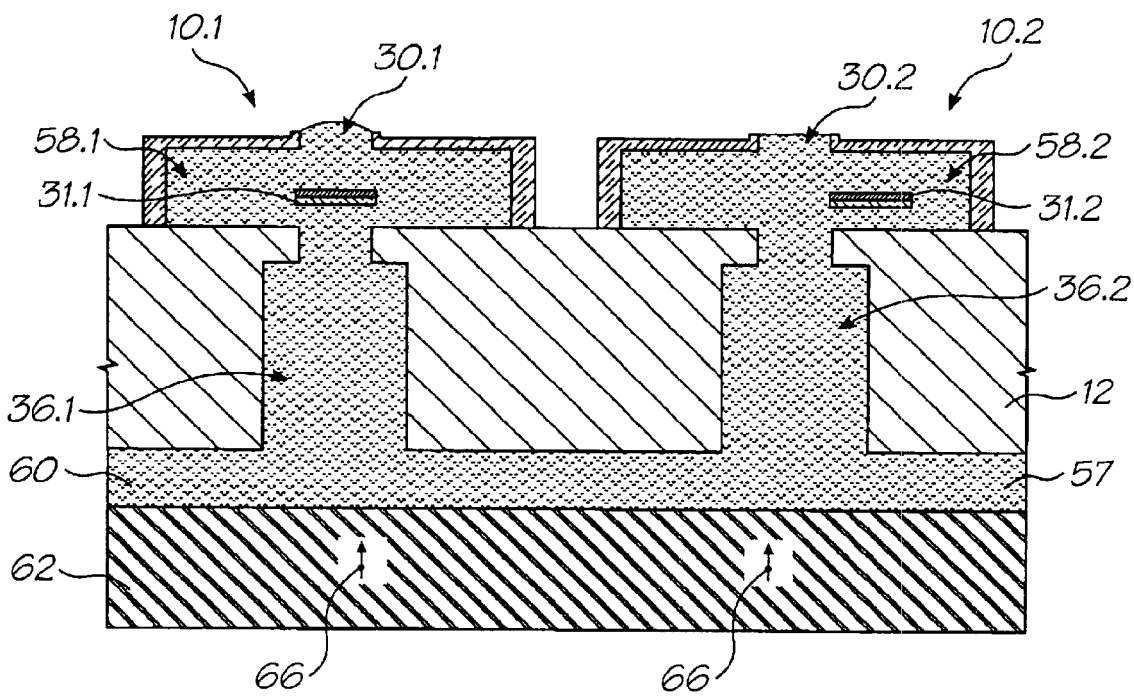
FIG. 19 shows a schematic side view of re-filling of the nozzle of the first nozzle arrangement.

In the second positive pressure cycle, as shown in FIG. 19 of the drawings, with the transducer moving again in the direction of arrow 66, the positive pressure applied to the ink results in a refilling of the chamber 58.2 of the nozzle 10. It is to be noted that the shutter 31.2 is still in an open position with the shutter 31.1 still being in a closed position. In this cycle, no ink is ejected from either nozzle 10.1 or 10.2.

Figure 20:
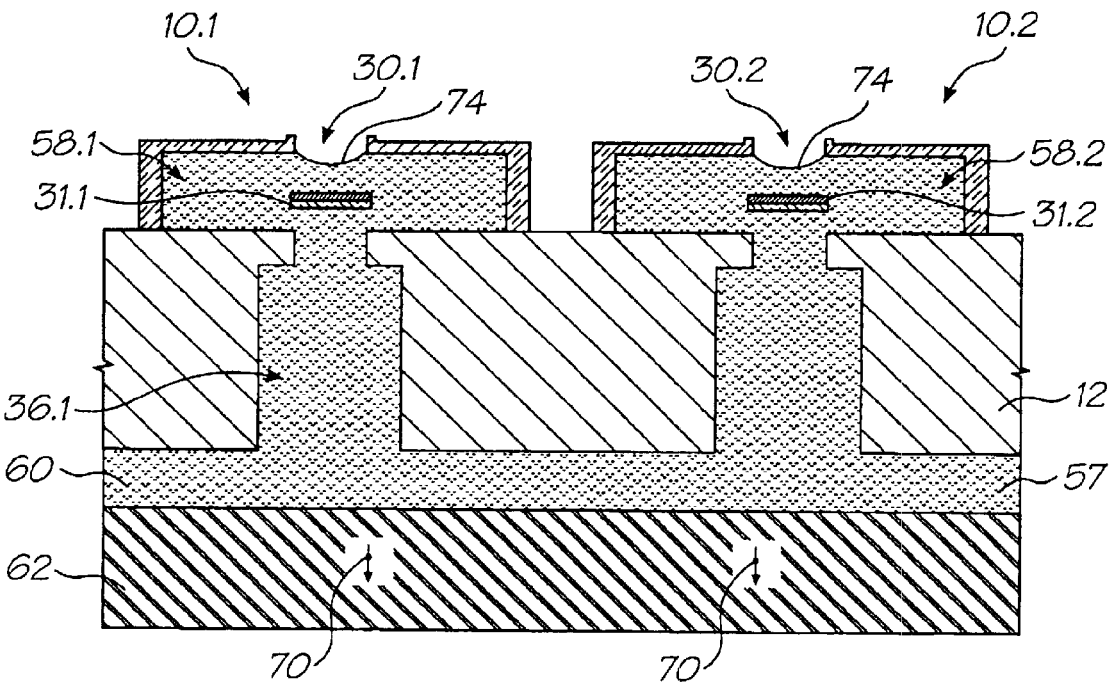
FIG. 20 shows operation of the array preceding commencement of ink ejection from the second of the illustrated nozzle arrangements.

Before the second negative pressure cycle, as shown in FIG. 20 of the drawings, the shutter 31.2 moves to its closed position. Then, as the transducer 62 again moves in the direction of arrows 70 to impart negative pressure to the ink 57, a slight concave meniscus 74 is formed at both ink ejection ports 30.1 and 30.2 However, due to the fact that both shutters 31.1 and 31.2 are closed, withdrawal of ink from the chambers 58.1 and 58.2 of the nozzles 10.1 and 10.2, respectively, is inhibited.

The amplitude of the ultrasonic transducer can be altered in response to the viscosity of the ink (which is typically affected by temperature), and the number of drops which are to be ejected in the current cycle. This amplitude adjustment can be used to maintain consistent drop size in varying environmental conditions.

The drop firing rate can be around 50 KHz. The ink jet head is suitable for fabrication as a monolithic page wide printhead. FIG. 2 shows a single nozzle of a 1600 dpi printhead in "up shooter" configuration.

Returning again to FIG. 1, one method of construction of the inkjet print nozzles 10 will now be described. Starting with the bottom wafer layer 12, the wafer is processed so as to add CMOS layers 13 with an aperture 14 being inserted. The nitride layer 16 is laid down on top of the CMOS layers so as to protect them from subsequent etchings.

A thin sacrificial glass layer is then laid down on top of nitride layers 16 followed by a first PTFE layer 19, the copper layer 18 and a second PTFE layer 20. Then a sacrificial glass layer is formed on top of the PTFE layer and etched to a depth of a few microns to form the nitride border regions 28. Next the top layer 29 is laid down over the sacrificial layer using the mask for forming the various holes including the processing step of forming the rim 40 on nozzle 30. The sacrificial glass is then dissolved away and the channel 15 formed through the wafer by means of utilisation of high density low pressure plasma etching such as that available from Surface Technology Systems.

Figure 3:
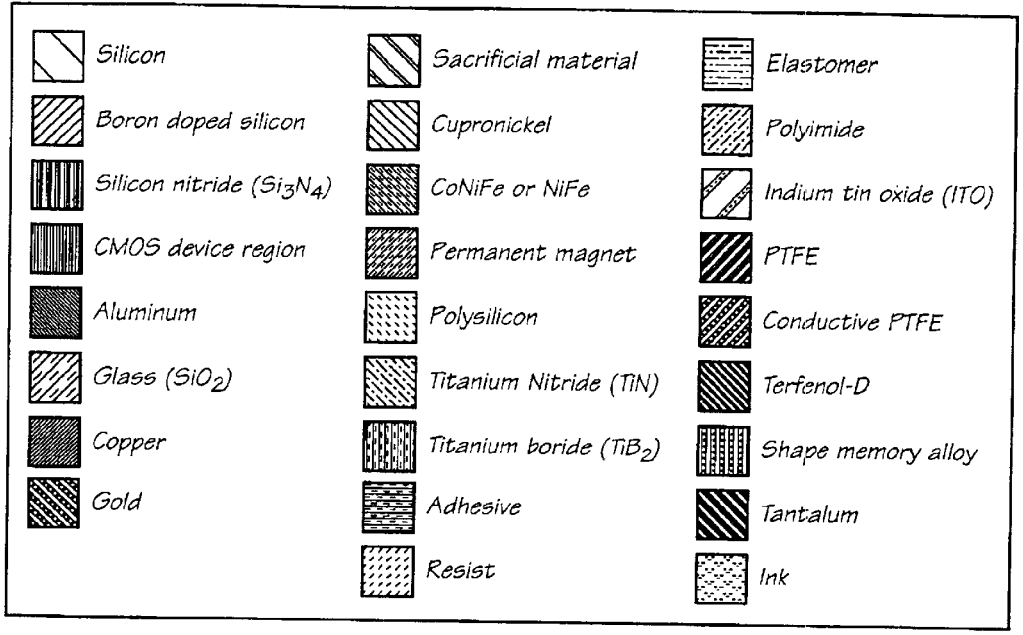
FIG. 3 provides a legend of the materials indicated in FIGS. 4 to 16.
Figure 4:
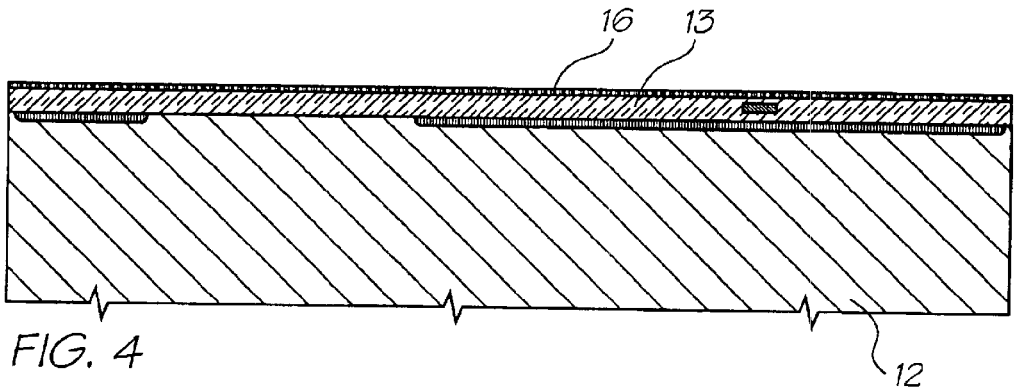
FIG. 4 to FIG. 16 illustrate sectional views of the manufacturing steps in one form of construction of an ink jet printhead nozzle.
Figure 5:
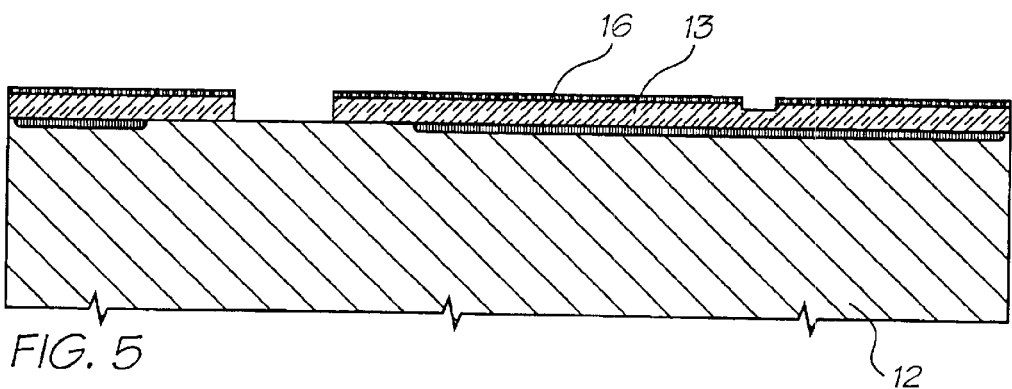
Figure 6:
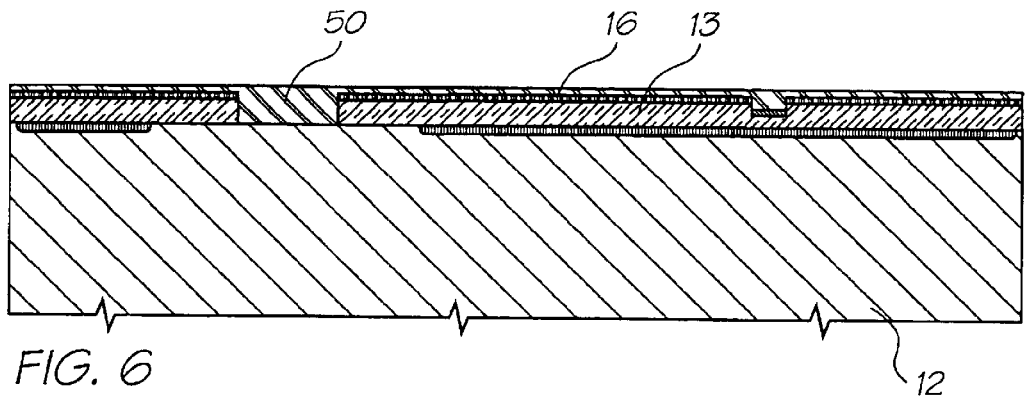
Figure 7:
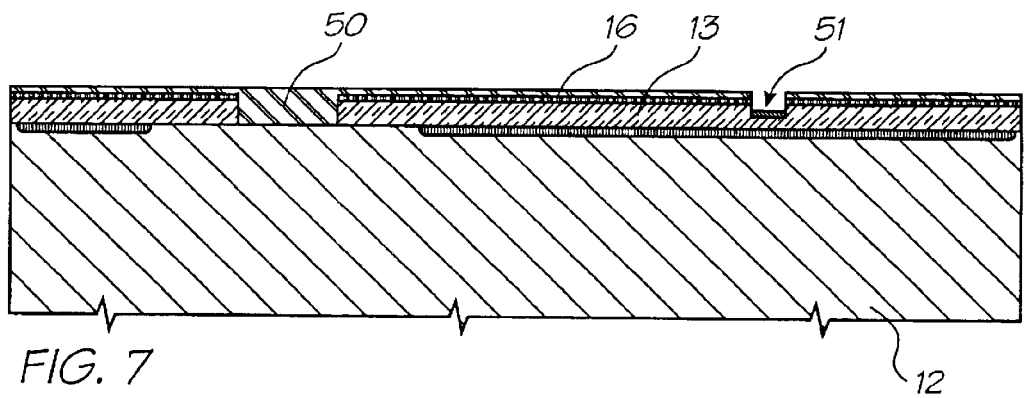
Figure 8:
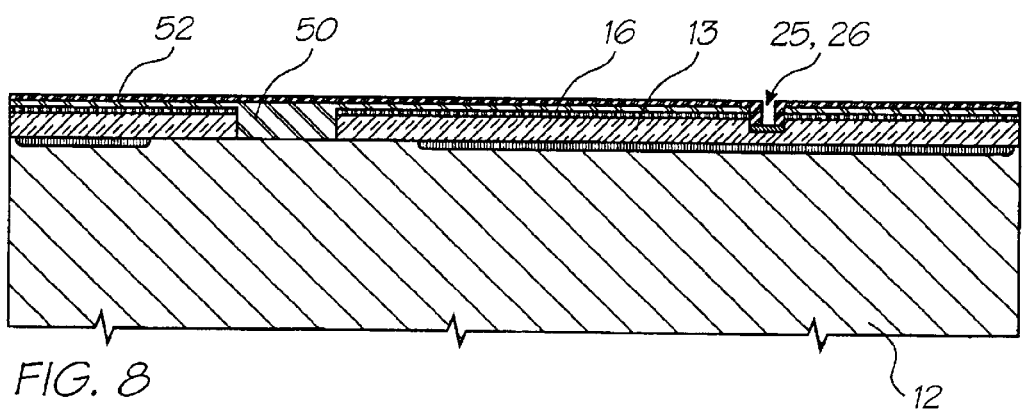
Figure 9:
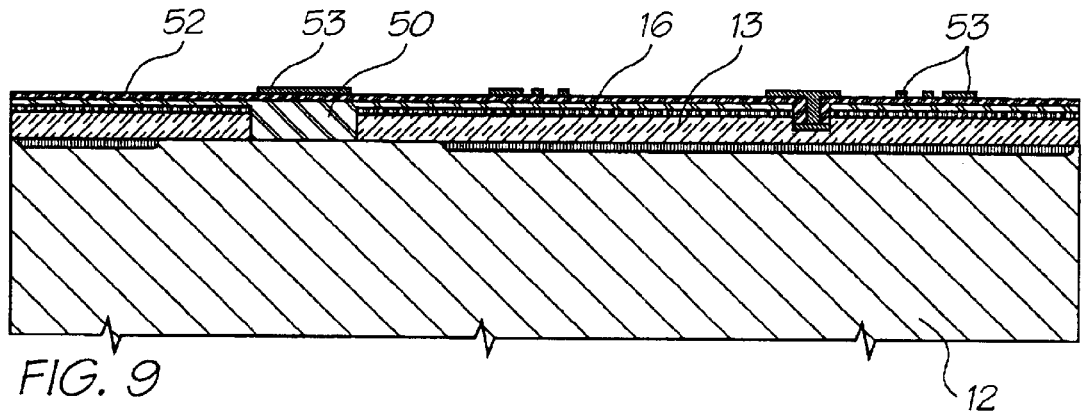
Figure 10:
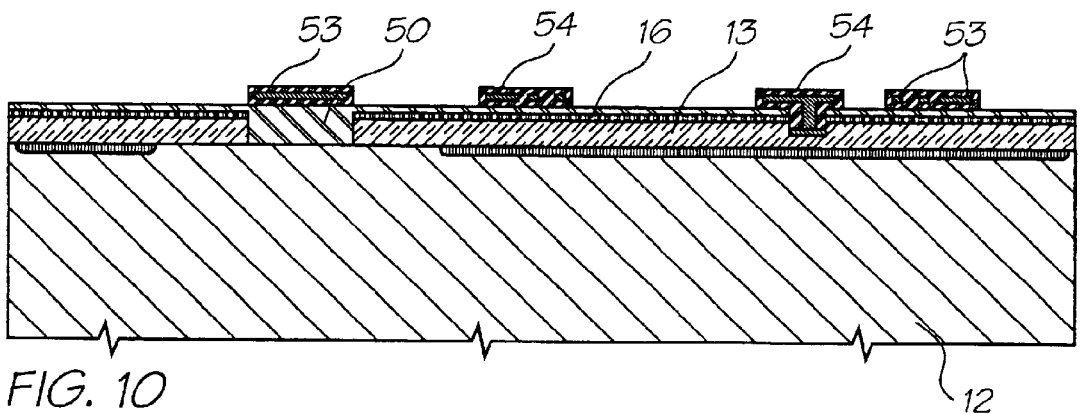
Figure 11:
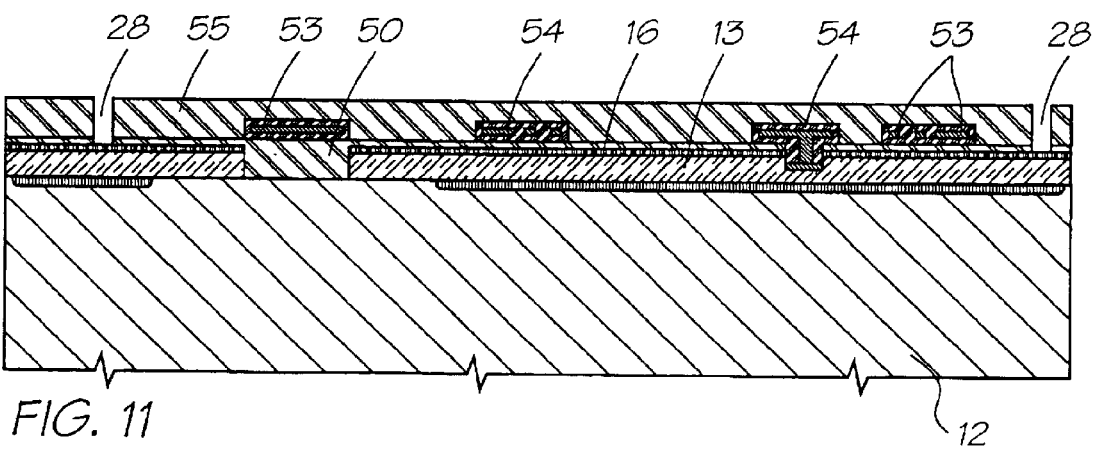
Figure 12:
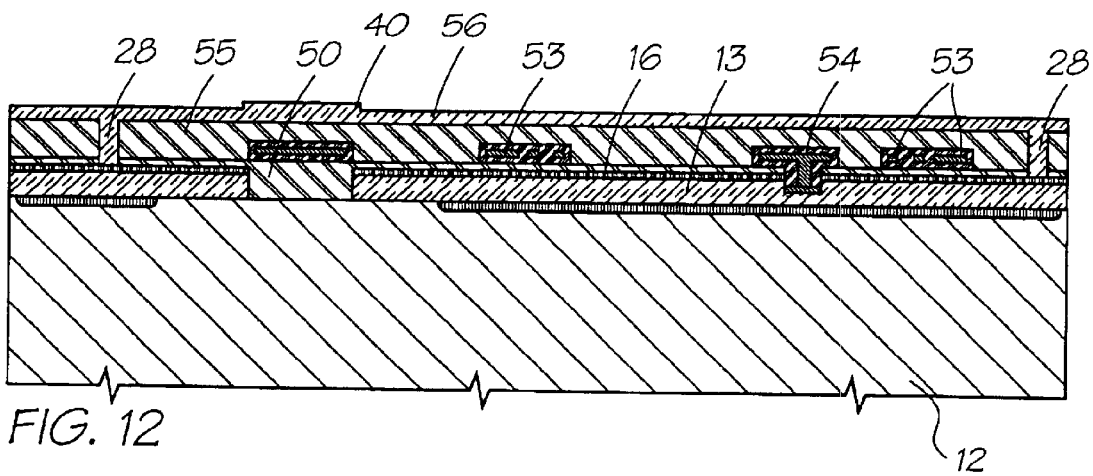
Figure 13:
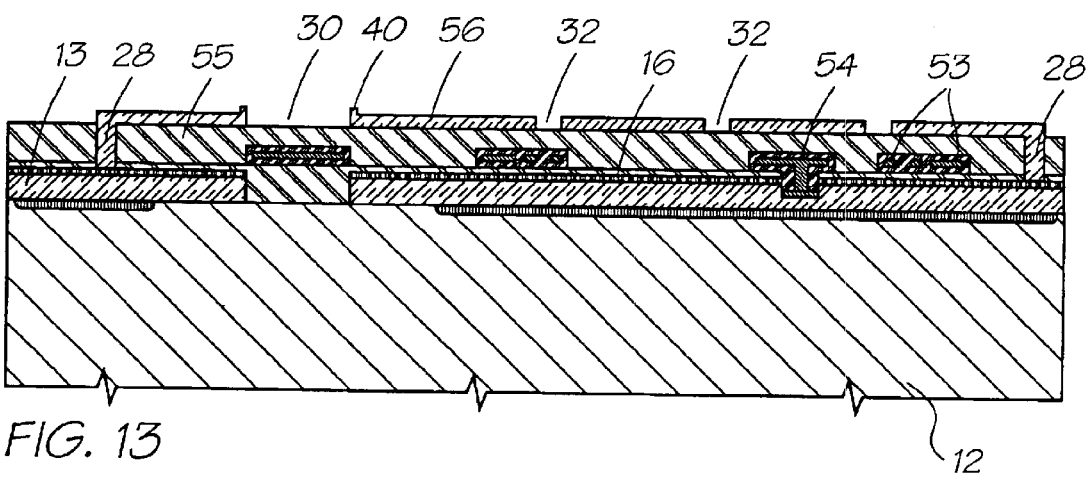
Figure 14:
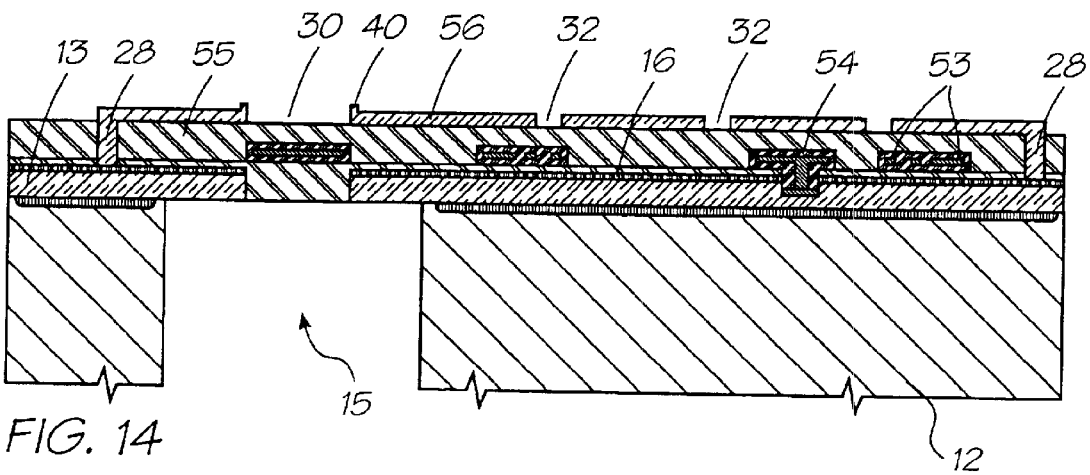
Figure 15:
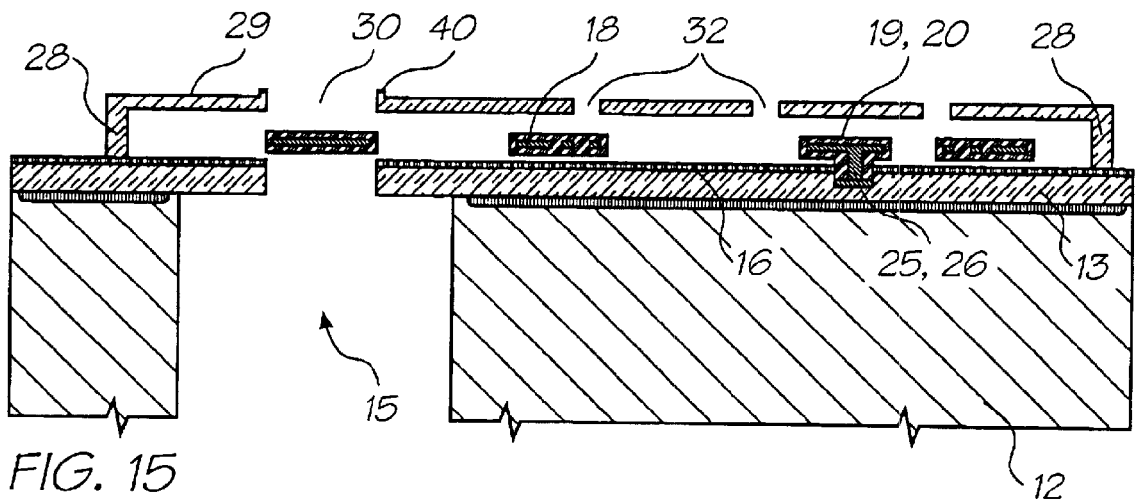
Figure 16:
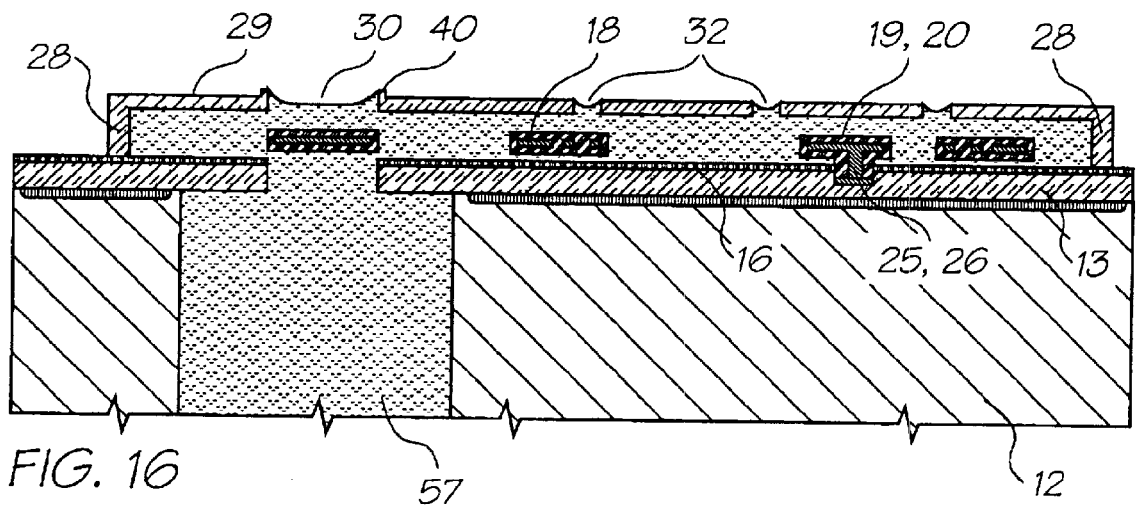

One form of detailed manufacturing process which can be used to fabricate monolithic ink jet printheads operating in accordance with the principles taught by the present embodiment can proceed using the following steps:

1. Using a double sided polished wafer 12, complete drive transistors, data distribution, and timing circuits using a 0.5 micron, one poly, 2 metal CMOS process 13. The wafer is passivated with 0.1 microns of silicon nitride 16. This step is shown in FIG. 4. For clarity, these diagrams may not be to scale, and may not represent a cross section though any single plane of the nozzle. FIG. 3 is a key to representations of various materials in these manufacturing diagrams, and those of other cross referenced ink jet configurations.
2. Etch nitride and oxide down to silicon using Mask 1. This mask defines the nozzle inlet below the shutter. This step is shown in FIG. 5.
3. Deposit 3 microns of sacrificial material 50 (e.g. aluminum or photosensitive polyimide)
4. Planarize the sacrificial layer to a thickness of 1 micron over nitride. This step is shown in FIG. 6.
5. Etch the sacrificial layer using Mask 2. This mask defines the actuator anchor point 51. This step is shown in FIG. 7.
6. Deposit 1 micron of PTFE 52.
7. Etch the PTFE, nitride, and oxide down to second level metal using Mask 3. This mask defines the heater vias 25, 26. This step is shown in FIG. 8.
8. Deposit the heater 53, which is a 1 micron layer of a conductor with a low Young's modulus, for example aluminum or gold.
9. Pattern the conductor using Mask 4. This step is shown in FIG. 9.
10. Deposit 1 micron of PTFE 54.
11. Etch the PTFE down to the sacrificial layer using Mask 5. This mask defines the actuator and shutter This step is shown in FIG. 10.
12. Wafer probe. All electrical connections are complete at this point, bond pads are accessible, and the chips are not yet separated.
13. Deposit 3 microns of sacrificial material 55. Planarize using CMP
14. Etch the sacrificial material using Mask 6. This mask defines the nozzle chamber wall 28. This step is shown in FIG. 11.
15. Deposit 3 microns of PECVD glass 56.
16. Etch to a depth of (approx.) 1 micron using Mask 7. This mask defines the nozzle rim 40. This step is shown in FIG. 12.
17. Etch down to the sacrificial layer using Mask 6. This mask defines the roof of the nozzle chamber, the nozzle 30, and the sacrificial etch access holes 32. This step is shown in FIG. 13.
18. Back-etch completely through the silicon wafer (with, for example, an ASE Advanced Silicon Etcher from Surface Technology Systems) using Mask 7. This mask defines the ink inlets 15 which are etched through the wafer. The wafer is also diced by this etch. This step is shown in FIG. 14.
19. Etch the sacrificial material. The nozzle chambers are cleared, the actuators freed, and the chips are separated by this etch. This step is shown in FIG. 15.
20. Mount the printheads in their packaging, which may be a molded plastic former incorporating ink channels which supply the appropriate color ink to the ink inlets at the back of the wafer. The package also includes a piezoelectric actuator attached to the rear of the ink channels. The piezoelectric actuator provides the oscillating ink pressure required for the ink jet operation.
21. Connect the printheads to their interconnect systems. For a low profile connection with minimum disruption of airflow, TAB may be used. Wire bonding may also be used if the printer is to be operated with sufficient clearance to the paper.
22. Hydrophobize the front surface of the printheads.
23. Fill the completed printheads with ink 57 and test them. A filled nozzle is shown in FIG. 16.

It would be appreciated by a person skilled in the art that numerous variations and/or modifications may be made to the present invention as shown in the preferred embodiment without departing from the spirit or scope of the invention as broadly described. The present embodiment is, therefore, to be considered in all respects to be illustrative and not restrictive.

The presently disclosed ink jet printing technology is potentially suited to a wide range of printing systems including: colour and monochrome office printers, short run digital printers, high speed digital printers, offset press supplemental printers, low cost scanning printers, high speed pagewidth printers, notebook computers with inbuilt pagewidth printers, portable colour and monochrome printers, colour and monochrome copiers, colour and monochrome facsimile machines, combined printer, facsimile and copying machines, label printers, large format plotters, photograph copiers, printers for digital photographic 'minilabs', video printers, PhotoCD printers, portable printers for PDAs, wallpaper printers, indoor sign printers, billboard printers, fabric printers, camera printers and fault tolerant commercial printer arrays.

Ink Jet Technologies

The embodiments of the invention use an ink jet printer type device. Of course many different devices could be used. However presently popular ink jet printing technologies are unlikely to be suitable.

The most significant problem with thermal ink jet is power consumption. This is approximately 100 times that required for high speed, and stems from the energy-inefficient means of drop ejection. This involves the rapid boiling of water to produce a vapor bubble which expels the ink. Water has a very high heat capacity, and must be superheated in thermal ink jet applications. This leads to an efficiency of around 0.02%, from electricity input to drop momentum (and increased surface area) out.

The most significant problem with piezoelectric inkjet is size and cost. Piezoelectric crystals have a very small deflection at reasonable drive voltages, and therefore require a large area for each nozzle. Also, each piezoelectric actuator must be connected to its drive circuit on a separate substrate. This is not a significant problem at the current limit of around 300 nozzles per printhead, but is a major impediment to the fabrication of pagewidth printheads with 19,200 nozzles.

Ideally, the ink jet technologies used meet the stringent requirements of in-camera digital color printing and other high quality, high speed, low cost printing applications. To meet the requirements of digital photography, new ink jet technologies have been created. The target features include:

low power (less than 10 Watts)

high resolution capability (1,600 dpi or more)

photographic quality output low manufacturing cost small size (pagewidth times minimum cross section)

high speed (<2 seconds per page).

All of these features can be met or exceeded by the ink jet systems described below with differing levels of difficulty. Forty-five different ink jet technologies have been developed by the Assignee to give a wide range of choices for high volume manufacture. These technologies form part of separate applications assigned to the present Assignee as set out in the table under the heading Cross References to Related Applications.

The ink jet designs shown here are suitable for a wide range of digital printing systems, from battery powered one-time use digital cameras, through to desktop and network printers, and through to commercial printing systems.

For ease of manufacture using standard process equipment, the printhead is designed to be a monolithic 0.5 micron CMOS chip with MEMS post processing. For color photographic applications, the printhead is 100 mm long, with a width which depends upon the inkjet type. The smallest printhead designed is IJ38, which is 0.35 mm wide, giving a chip area of 35 square mm. The printheads each contain 19,200 nozzles plus data and control circuitry.

Ink is supplied to the back of the printhead by injection molded plastic ink channels. The molding requires 50 micron features, which can be created using a lithographically micromachined insert in a standard injection molding tool. Ink flows through holes etched through the wafer to the nozzle chambers fabricated on the front surface of the wafer. The printhead is connected to the camera circuitry by tape automated bonding.

Tables of Drop-On-Demand Ink Jets

Eleven important characteristics of the fundamental operation of individual ink jet nozzles have been identified. These characteristics are largely orthogonal, and so can be elucidated as an eleven dimensional matrix. Most of the eleven axes of this matrix include entries developed by the present assignee.

The following tables form the axes of an eleven dimensional table of ink jet types.

Actuator mechanism (18 types)
Basic operation mode (7 types)
Auxiliary mechanism (8 types)
Actuator amplification or modification method (17 types)
Actuator motion (19 types)
Nozzle refill method (4 types)
Method of restricting back-flow through inlet (10 types)
Nozzle clearing method (9 types)
Nozzle plate construction (9 types)
Drop ejection direction (5 types)
Ink type (7 types)

The complete eleven dimensional table represented by these axes contains 36.9 billion possible configurations of ink jet nozzle. While not all of the possible combinations result in a viable ink jet technology, many million configurations are viable. It is clearly impractical to elucidate all of the possible configurations. Instead, certain ink jet types have been investigated in detail. These are designated IJ01 to IJ45 above which matches the docket numbers in the table under the heading Cross References to Related Applications.

Other ink jet configurations can readily be derived from these forty-five examples by substituting alternative configurations along one or more of the 11 axes. Most of the IJ01 to IJ45 examples can be made into ink jet printheads with characteristics superior to any currently available ink jet technology.

Where there are prior art examples known to the inventor, one or more of these examples are listed in the examples column of the tables below. The IJ01 to IJ45 series are also listed in the examples column. In some cases, a print technology may be listed more than once in a table, where it shares characteristics with more than one entry.

Suitable applications for the ink jet technologies include: Home printers, Office network printers, Short run digital printers, Commercial print systems, Fabric printers, Pocket printers, Internet WWW printers, Video printers, Medical imaging, Wide format printers, Notebook PC printers, Fax machines, Industrial printing systems, Photocopiers, Photographic minilabs etc.

The information associated with the aforementioned 11 dimensional matrix are set out in the following tables.

| | Description | Advantages | Disadvantages | Examples |
|---|---|---|---|---|
| ACTUATOR MECHANISM (APPLIED ONLY TO SELECTED INK DROPS) | | | | |
| Thermal bubble | An electrothermal heater heats the ink to above boiling point, transferring significant heat to the aqueous ink. A bubble nucleates and quickly forms, expelling the ink. The efficiency of the process is low, with | Large force generated Simple construction No moving parts Fast operation Small chip area required for actuator | High power Ink carrier limited to water Low efficiency High temperatures required High mechanical stress Unusual materials required | Canon Bubblejet 1979 Endo et al GB patent 2,007,162 Xerox heater-in-pit 1990 Hawkins et al U.S. Pat. No. 4,899,181 Hewlett-Packard TIJ 1982 Vaught et al U.S. Pat. No. 4,490,728 |

| | Description | Advantages | Disadvantages | Examples |
|---|---|---|---|---|
| | typically less than 0.05% of the electrical energy being transformed into kinetic energy of the drop. | | Large drive transistors Cavitation causes actuator failure Kogation reduces bubble formation Large print heads are difficult to fabricate | |
| Piezoelectric | A piezoelectric crystal such as lead lanthanum zirconate (PZT) is electrically activated, and either expands, shears, or bends to apply pressure to the ink, ejecting drops. | Low power consumption Many ink types can be used Fast operation High efficiency | Very large area required for actuator Difficult to integrate with electronics High voltage drive transistors required Full pagewidth print heads impractical due to actuator size Requires electrical poling in high field strengths during manufacture | Kyser et al U.S. Pat. No. 3,946,398 Zoltan U.S. Pat. No. 3,683,212 1973 Stemme U.S. Pat. No. 3,747,120 Epson Stylus Tektronix IJ04 |
| Electrostrictive | An electric field is used to activate electrostriction in relaxor materials such as lead lanthanum zirconate titanate (PLZT) or lead magnesium niobate (PMN). | Low power consumption Many ink types can be used Low thermal expansion Electric field strength required (approx. 3.5 V/$\mu$m) can be generated without difficulty Does not require electrical poling | Low maximum strain (approx. 0.01%) Large area required for actuator due to low strain Response speed is marginal (~10 $\mu$s) High voltage drive transistors required Full pagewidth print heads impractical due to actuator size | Seiko Epson, Usui et all JP 253401/96 IJ04 |
| Ferroelectric | An electric field is used to induce a phase transition between the antiferroelectric (AFE) and ferroelectric (FE) phase. Perovskite materials such as tin modified lead lanthanum zirconate titanate (PLZSnT) exhibit large strains of up to 1% associated with the AFE to FE phase transition. | Low power consumption Many ink types can be used Fast operation (<1 $\mu$s) Relatively high longitudinal strain High efficiency Electric field strength of around 3 V/$\mu$m can be readily provided | Difficult to integrate with electronics Unusual materials such as PLZSnT are required Actuators require a large area | IJ04 |
| Electrostatic plates | Conductive plates are separated by a compressible or fluid dielectric (usually air). Upon application of a voltage, the plates attract each other and displace ink, causing drop ejection. The conductive plates may be in a comb or honeycomb structure, or stacked to increase the surface area and therefore the force. | Low power consumption Many ink types can be used Fast operation | Difficult to operate electrostatic devices in an aqueous environment The electrostatic actuator will normally need to be separated from the ink Very large area required to achieve high forces High voltage drive transistors may be required Full pagewidth print heads are not competitive due to actuator size | IJ02, IJ04 |
| Electrostatic pull on ink | A strong electric field is applied to the ink, whereupon electrostatic attraction | Low current consumption Low temperature | High voltage required May be damaged by sparks due to air | 1989 Saito et al, U.S. Pat. No. 4,799,068 1989 Miura et al, U.S. Pat. No. 4,810,954 |

-continued

| | Description | Advantages | Disadvantages | Examples |
|---|---|---|---|---|
| | accelerates the ink towards the print medium. | | breakdown Required field strength increases as the drop size decreases High voltage drive transistors required Electrostatic field attracts dust | Tone-jet |
| Permanent magnet electromagnetic | An electromagnet directly attracts a permanent magnet, displacing ink and causing drop ejection. Rare earth magnets with a field strength around 1 Tesla can be used. Examples are: Samarium Cobalt (SaCo) and magnetic materials in the neodymium iron boron family (NdFeB, NdDyFeBNb, NdDyFeB, etc) | Low power consumption Many ink types can be used Fast operation High efficiency Easy extension from single nozzles to pagewidth print heads | Complex fabrication Permanent magnetic material such as Neodymium Iron Boron (NdFeB) required. High local currents required Copper metalization should be used for long electromigration lifetime and low resistivity Pigmented inks are usually infeasible Operating temperature limited to the Curie temperature (around 540K) | IJ07, IJ10 |
| Soft magnetic core electromagnetic | A solenoid induced a magnetic field in a soft magnetic core or yoke fabricated from a ferrous material such as electroplated iron alloys such as CoNiFe [1], CoFe, or NiFe alloys. Typically, the soft magnetic material is in two parts, which are normally held apart by a spring. When the solenoid is actuated, the two parts attract, displacing the ink. | Low power consumption Many ink types can be used Fast operation High efficiency Easy extension from single nozzles to pagewidth print heads | Complex fabrication Materials not usually present in a CMOS fab such as NiFe, CoNiFe, or CoFe are required High local currents required Copper metalization should be used for long electromigration lifetime and low resistivity Electroplating is required High saturation flux density is required (2.0–2.1 T is achievable with CoNiFe [1]) | IJ01, IJ05, IJ08, IJ10, IJ12, IJ14, IJ15, IJ17 |
| Lorenz force | The Lorenz force acting on a current carrying wire in a magnetic field is utilized. This allows the magnetic field to be supplied externally to the print head, for example with rare earth permanent magnets. Only the current carrying wire need be fabricated on the print-head, simplifying materials requirements. | Low power consumption Many ink types can be used Fast operation High efficiency Easy extension from single nozzles to pagewidth print heads | Force acts as a twisting motion Typically, only a quarter of the solenoid length provides force in a useful direction High local currents required Copper metalization should be used for long electromigration lifetime and low resistivity Pigmented inks are usually infeasible | IJ06, IJ11, IJ13, IJ16 |
| Magnetostriction | The actuator uses the giant magnetostrictive effect of materials such as Terfenol-D (an alloy of terbium, | Many ink types can be used Fast operation Easy extension from single nozzles | Force acts as a twisting motion Unusual materials such as Terfenol-D are | Fischenbeck, U.S. Pat. No. 4,032,929 IJ25 |

|  | Description | Advantages | Disadvantages | Examples |
| --- | --- | --- | --- | --- |
|  | dysprosium and iron developed at the Naval Ordnance Laboratory, hence Ter-Fe-NOL). For best efficiency, the actuator should be pre-stressed to approx. 8 Mpa. | to pagewidth print heads High force is available | required High local currents required Copper metalization should be used for long electromigration lifetime and low resistivity Pre-stressing may be required |  |
| Surface tension reduction | Ink under positive pressure is held in a nozzle by surface tension. The surface tension of the ink is reduced below the bubble threshold, causing the ink to egress from the nozzle. | Low power consumption Simple construction No unusual materials required in fabrication High efficiency Easy extension from single nozzles to pagewidth print heads | Requires supplementary force to effect drop separation Requires special ink surfactants Speed may be limited by surfactant properties | Silverbrook, EP 0771 658 A2 and related patent applications |
| Viscosity reduction | The ink viscosity is locally reduced to select which drops are to be ejected. A viscosity reduction can be achieved electrothermally with most inks, but special inks can be engineered for a 100:1 viscosity reduction. | Simple construction No unusual materials required in fabrication Easy extension from single nozzles to pagewidth print heads | Requires supplementary force to effect drop separation Requires special ink viscosity properties High speed is difficult to achieve Requires oscillating ink pressure A high temperature difference (typically 80 degrees) is required | Silverbrook, EP 0771 658 A2 and related patent applications |
| Acoustic | An acoustic wave is generated and focussed upon the drop ejection region. | Can operate without a nozzle plate | Complex drive circuitry Complex fabrication Low efficiency Poor control of drop position Poor control of drop volume | 1993 Hadimioglu et al, EUP 550,192 1993 Elrod et al, EUP 572,220 |
| Thermoelastic bend actuator | An actuator which relies upon differential thermal expansion upon Joule heating is used. | Low power consumption Many ink types can be used Simple planar fabrication Small chip area required for each actuator Fast operation High efficiency CMOS compatible voltages and currents Standard MEMS processes can be used Easy extension from single nozzles to pagewidth print heads | Efficient aqueous operation requires a thermal insulator on the hot side Corrosion prevention can be difficult Pigmented inks may be infeasible, as pigment particles may jam the bend actuator | IJ03, IJ09, IJ17, IJ18, IJ19, IJ20, IJ21, IJ22, IJ23, IJ24, IJ27, IJ28, IJ29, IJ30, IJ31, IJ32, IJ33, IJ34, IJ35, IJ36, IJ37, IJ38, IJ39, IJ40, IJ41 |
| High CTE thermoelastic actuator | A material with a very high coefficient of thermal expansion (CTE) such as polytetrafluoroethylene (PTFE) is used. As high CTE materials are usually non- | High force can be generated Three methods of PTFE deposition are under development: chemical vapor deposition (CVD), spin coating, and | Requires special material (e.g. PTFE) Requires a PTFE deposition process, which is not yet standard in ULSI fabs PTFE deposition | IJ09, IJ17, IJ18, IJ20, IJ21, IJ22, IJ23, IJ24, IJ27, IJ28, IJ29, IJ30, IJ31, IJ42, IJ43, IJ44 |

| | Description | Advantages | Disadvantages | Examples |
|---|---|---|---|---|
| | conductive, a heater fabricated from a conductive material is incorporated. A 50 μm long PTFE bend actuator with polysilicon heater and 15 mW power input can provide 180 μN force and 10 μm deflection. Actuator motions include:<br>Bend<br>Push<br>Buckle<br>Rotate | evaporation<br>PTFE is a candidate for low dielectric constant insulation in ULSI<br>Very low power consumption<br>Many ink types can be used<br>Simple planar fabrication<br>Small chip area required for each actuator<br>Fast operation<br>High efficiency<br>CMOS compatible voltages and currents<br>Easy extension from single nozzles to pagewidth print heads | cannot be followed with high temperature (above 350° C.) processing<br>Pigmented inks may be infeasible, as pigment particles may jam the bend actuator | |
| Conduct-ive polymer thermoelastic actuator | A polymer with a high coefficient of thermal expansion (such as PTFE) is doped with conducting substances to increase its conductivity to about 3 orders of magnitude below that of copper. The conducting polymer expands when resistively heated.<br>Examples of conducting dopants include:<br>Carbon nanotubes<br>Metal fibers<br>Conductive polymers such as doped polythiophene<br>Carbon granules | High force can be generated<br>Very low power consumption<br>Many ink types can be used<br>Simple planar fabrication<br>Small chip area required for each actuator<br>Fast operation<br>High efficiency<br>CMOS compatible voltages and currents<br>Easy extension from single nozzles to pagewidth print heads | Requires special materials development (High CTE conductive polymer)<br>Requires a PTFE deposition process, which is not yet standard in ULSI fabs<br>PTFE deposition cannot be followed with high temperature (above 350 ° C.) processing<br>Evaporation and CVD deposition techniques cannot be used<br>Pigmented inks may be infeasible, as pigment particles may jam the bend actuator | IJ24 |
| Shape memory alloy | A shape memory alloy such as TiNi (also known as Nitinol - Nickel Titanium alloy developed at the Naval Ordnance Laboratory) is thermally switched between its weak martensitic state and its high stiffness austenic state. The shape of the actuator in its martensitic state is deformed relative to the austenic shape. The shape change causes ejection of a drop. | High force is available (stresses of hundreds of MPa)<br>Large strain is available (more than 3%)<br>High corrosion resistance<br>Simple construction<br>Easy extension from single nozzles to pagewidth print heads<br>Low voltage operation | Fatigue limits maximum number of cycles<br>Low strain (1%) is required to extend fatigue resistance<br>Cycle rate limited by heat removal<br>Requires unusual materials (TiNi)<br>The latent heat of transformation must be provided<br>High current operation<br>Requires pre-stressing to distort the martensitic state | IJ26 |
| Linear Magnetic Actuator | Linear magnetic actuators include the Linear Induction Actuator (LIA), Linear Permanent Magnet Synchronous Actuator (LPMSA), Linear Reluctance Synchronous Actuator (LRSA), Linear Switched Reluctance Actuator (LSRA), and | Linear Magnetic actuators can be constructed with high thrust, long travel, and high efficiency using planar semiconductor fabrication techniques<br>Long actuator travel is available | Requires unusual semiconductor materials such as soft magnetic alloys (e.g. CoNiFe)<br>Some varieties also require permanent magnetic materials such as Neodymium iron boron (NdFeB)<br>Requires | IJ12 |

| | Description | Advantages | Disadvantages | Examples |
| --- | --- | --- | --- | --- |
| | the Linear Stepper Actuator (LSA). | Medium force is available Low voltage operation | complex multi-phase drive circuitry High current operation | |
| | | BASIC OPERATION MODE | | |
| Actuator directly pushes ink | This is the simplest mode of operation: the actuator directly supplies sufficient kinetic energy to expel the drop. The drop must have a sufficient velocity to overcome the surface tension. | Simple operation No external fields required Satellite drops can be avoided if drop velocity is less than 4 m/s Can be efficient, depending upon the actuator used | Drop repetition rate is usually limited to around 10 kHz. However, this is not fundamental to the method, but is related to the refill method normally used All of the drop kinetic energy must be provided by the actuator Satellite drops usually form if drop velocity is greater than 4.5 m/s | Thermal ink jet Piezoelectric ink jet IJ01, IJ02, IJ03, IJ04, IJ05, IJ06, IJ07, IJ09, IJ11, IJ12, IJ14, IJ16, IJ20, IJ22, IJ23, IJ24, IJ25, IJ26, IJ27, IJ28, IJ29, IJ30, IJ31, IJ32, IJ33, IJ34, IJ35, IJ36, IJ37, IJ38, IJ39, IJ40, IJ41, IJ42, IJ43, IJ44 |
| Proximity | The drops to be printed are selected by some manner (e.g. thermally induced surface tension reduction of pressurized ink). Selected drops are separated from the ink in the nozzle by contact with the print medium or a transfer roller. | Very simple print head fabrication can be used The drop selection means does not need to provide the energy required to separate the drop from the nozzle | Requires close proximity between the print head and the print media or transfer roller May require two print heads printing alternate rows of the image Monolithic color print heads are difficult | Silverbrook, EP 0771 658 A2 and related patent applications |
| Electrostatic pull on ink | The drops to be printed are selected by some manner (e.g. thermally induced surface tension reduction of pressurized ink). Selected drops are separated from the ink in the nozzle by a strong electric field. | Very simple print head fabrication can be used The drop selection means does not need to provide the energy required to separate the drop from the nozzle | Requires very high electrostatic field Electrostatic field for small nozzle sizes is above air breakdown Electrostatic field may attract dust | Silverbrook, EP 0771 658 A2 and related patent applications Tone-Jet |
| Magnetic pull on ink | The drops to be printed are selected by some manner (e.g. thermally induced surface tension reduction of pressurized ink). Selected drops are separated from the ink in the nozzle by a strong magnetic field acting on the magnetic ink. | Very simple print head fabrication can be used The drop selection means does not need to provide the energy required to separate the drop from the nozzle | Requires magnetic ink Ink colors other than black are difficult Requires very high magnetic fields | Silverbrook, EP 0771 658 A2 and related patent applications |
| Shutter | The actuator moves a shutter to block ink flow to the nozzle. The ink pressure is pulsed at a multiple of the drop ejection frequency. | High speed (>50 kHz) operation can be achieved due to reduced refill time Drop timing can be very accurate The actuator energy can be very low | Moving parts are required Requires ink pressure modulator Friction and wear must be considered Stiction is possible | IJ13, IJ17, IJ21 |
| Shuttered grill | The actuator moves a shutter to block ink flow through a grill to the nozzle. The shutter movement need only be equal to the width of the grill holes. | Actuators with small travel can be used Actuators with small force can be used High speed (>50 kHz) operation can be achieved | Moving parts are required Requires ink pressure modulator Friction and wear must be considered Stiction is possible | IJ08, IJ15, IJ18, IJ19 |

-continued

|   | Description | Advantages | Disadvantages | Examples |
|---|---|---|---|---|
| Pulsed magnetic pull on ink pusher | A pulsed magnetic field attracts an 'ink pusher' at the drop ejection frequency. An actuator controls a catch, which prevents the ink pusher from moving when a drop is not to be ejected. | Extremely low energy operation is possible No heat dissipation problems | Requires an external pulsed magnetic field Requires special materials for both the actuator and the ink pusher Complex construction | IJ10 |

AUXILIARY MECHANISM (APPLIED TO ALL NOZZLES)

|   | Description | Advantages | Disadvantages | Examples |
|---|---|---|---|---|
| None | The actuator directly fires the ink drop, and there is no external field or other mechanism required. | Simplicity of construction Simplicity of operation Small physical size | Drop ejection energy must be supplied by individual nozzle actuator | Most ink jets, including piezoelectric and thermal bubble. IJ01, IJ02, IJ03, IJ04, IJ05, IJ07, IJ09, IJ11, IJ12, IJ14, IJ20, IJ22, IJ23, IJ24, IJ25, IJ26, IJ27, IJ28, IJ29, IJ30, IJ31, IJ32, IJ33, IJ34, IJ35, IJ36, IJ37, IJ38, IJ39, IJ40, IJ41, IJ42, IJ43, IJ44 |
| Oscillating ink pressure (including acoustic stimulation) | The ink pressure oscillates, providing much of the drop ejection energy. The actuator selects which drops are to be fired by selectively blocking or enabling nozzles. The ink pressure oscillation may be achieved by vibrating the print head, or preferably by an actuator in the ink supply. | Oscillating ink pressure can provide a refill pulse, allowing higher operating speed The actuators may operate with much lower energy Acoustic lenses can be used to focus the sound on the nozzles | Requires external ink pressure oscillator Ink pressure phase and amplitude must be carefully controlled Acoustic reflections in the ink chamber must be designed for | Silverbrook, EP 0771 658 A2 and related patent applications IJ08, IJ13, IJ15, IJ17, IJ18, IJ19, IJ21 |
| Media proximity | The print head is placed in close proximity to the print medium. Selected drops protrude from the print head further than unselected drops, and contact the print medium. The drop soaks into the medium fast enough to cause drop separation. | Low power High accuracy Simple print head construction | Precision assembly required Paper fibers may cause problems Cannot print on rough substrates | Silverbrook, EP 0771 658 A2 and related patent applications |
| Transfer roller | Drops are printed to a transfer roller instead of straight to the print medium. A transfer roller can also be used for proximity drop separation. | High accuracy Wide range of print substrates can be used Ink can be dried on the transfer roller | Bulky Expensive Complex construction | Silverbrook, EP 0771 658 A2 and related patent applications Tektronix hot melt piezoelectric ink jet Any of the IJ series |
| Electrostatic | An electric field is used to accelerate selected drops towards the print medium. | Low power Simple print head construction | Field strength required for separation of small drops is near or above air breakdown | Silverbrook, EP 0771 658 A2 and related patent applications Tone-Jet |
| Direct magnetic field | A magnetic field is used to accelerate selected drops of magnetic ink towards the print medium. | Low power Simple print head construction | Requires magnetic ink Requires strong magnetic field | Silverbrook, EP 0771 658 A2 and related patent applications |
| Cross magnetic field | The print head is placed in a constant magnetic field. The Lorenz force in a | Does not require magnetic materials to be integrated in the print head | Requires external magnet Current densities may be high, | IJ06, IJ16 |

|  | Description | Advantages | Disadvantages | Examples |
| --- | --- | --- | --- | --- |
|  | current carrying wire is used to move the actuator. | manufacturing process | resulting in electromigration problems |  |
| Pulsed magnetic field | A pulsed magnetic field is used to cyclically attract a paddle, which pushes on the ink. A small actuator moves a catch, which selectively prevents the paddle from moving. | Very low power operation is possible Small print head size | Complex print head construction Magnetic materials required in print head | IJ10 |
| ACTUATOR AMPLIFICATION OR MODIFICATION METHOD | | | | |
| None | No actuator mechanical amplification is used. The actuator directly drives the drop ejection process. | Operational simplicity | Many actuator mechanisms have insufficient travel, or insufficient force, to efficiently drive the drop ejection process | Thermal Bubble Ink jet IJ01, IJ02, IJ06, IJ07, IJ16, IJ25, IJ26 |
| Differential expansion bend actuator | An actuator material expands more on one side than on the other. The expansion may be thermal, piezoelectric, magnetostrictive, or other mechanism. The bend actuator converts a high force low travel actuator mechanism to high travel, lower force mechanism. | Provides greater travel in a reduced print head area | High stresses are involved Care must be taken that the materials do not delaminate Residual bend resulting from high temperature or high stress during formation | Piezoelectric IJ03, IJ09, IJ17, IJ18, IJ19, IJ20, IJ21, IJ22, IJ23, IJ24, IJ27, IJ29, IJ30, IJ31, IJ32, IJ33, IJ34, IJ35, IJ36, IJ37, IJ38, IJ39, IJ42, IJ43, IJ44 |
| Transient bend actuator | A trilayer bend actuator where the two outside layers are identical. This cancels bend due to ambient temperature and residual stress. The actuator only responds to transient heating of one side or the other. | Very good temperature stability High speed, as a new drop can be fired before heat dissipates Cancels residual stress of formation | High stresses are involved Care must be taken that the materials do not delaminate | IJ40, IJ41 |
| Reverse spring | The actuator loads a spring. When the actuator is turned off, the spring releases. This can reverse the force/distance curve of the actuator to make it compatible with the force/time requirements of the drop ejection. | Better coupling to the ink | Fabrication complexity High stress in the spring | IJ05, IJ11 |
| Actuator stack | A series of thin actuators are stacked. This can be appropriate where actuators require high electric field strength, such as electrostatic and piezoelectric actuators. | Increased travel Reduced drive voltage | Increased fabrication complexity Increased possibility of short circuits due to pinholes | Some piezoelectric ink jets IJ04 |
| Multiple actuators | Multiple smaller actuators are used simultaneously to move the ink. Each actuator need provide only a portion of the force required. | Increases the force available from an actuator Multiple actuators can be positioned to control ink flow accurately | Actuator forces may not add linearly, reducing efficiency | IJ12, IJ13, IJ18, IJ20, IJ22, IJ28, IJ42, IJ43 |
| Linear Spring | A linear spring is used to transform a motion with small travel and high force into a longer travel, lower force motion. | Matches low travel actuator with higher travel requirements Non-contact method of motion transformation | Requires print head area for the spring | IJ15 |

-continued

| | Description | Advantages | Disadvantages | Examples |
|---|---|---|---|---|
| Coiled actuator | A bend actuator is coiled to provide greater travel in a reduced chip area. | Increases travel Reduces chip area Planar implementations are relatively easy to fabricate. | Generally restricted to planar implementations due to extreme fabrication difficulty in other orientations. | IJ17, IJ21, IJ34, IJ35 |
| Flexure bend actuator | A bend actuator has a small region near the fixture point, which flexes much more readily than the remainder of the actuator. The actuator flexing is effectively converted from an even coiling to an angular bend, resulting in greater travel of the actuator tip. | Simple means of increasing travel of a bend actuator | Care must be taken not to exceed the elastic limit in the flexure area Stress distribution is very uneven Difficult to accurately model with finite element analysis | IJ10, IJ19, IJ33 |
| Catch | The actuator controls a small catch. The catch either enables or disables movement of an ink pusher that is controlled in a bulk manner. | Very low actuator energy Very small actuator size | Complex construction Requires external force Unsuitable for pigmented inks | IJ10 |
| Gears | Gears can be used to increase travel at the expense of duration. Circular gears, rack and pinion, ratchets, and other gearing methods can be used. | Low force, low travel actuators can be used Can be fabricated using standard surface MEMS processes | Moving parts are required Several actuator cycles are required More complex drive electronics Complex construction Friction, friction, and wear are possible | IJ13 |
| Buckle plate | A buckle plate can be used to change a slow actuator into a fast motion. It can also convert a high force, low travel actuator into a high travel, medium force motion. | Very fast movement achievable | Must stay within elastic limits of the materials for long device life High stresses involved Generally high power requirement | S. Hirata et al, "An Ink-jet Head Using Diaphragm Microactuator", Proc. IEEE MEMS, Feb. 1996, pp 418–423. IJ18, IJ27 |
| Tapered magnetic pole | A tapered magnetic pole can increase travel at the expense of force. | Linearizes the magnetic force/distance curve | Complex construction | IJ14 |
| Lever | A lever and fulcrum is used to transform a motion with small travel and high force into a motion with longer travel and lower force. The lever can also reverse the direction of travel. | Matches low travel actuator with higher travel requirements Fulcrum area has no linear movement, and can be used for a fluid seal | High stress around the fulcrum | IJ32, IJ36, IJ37 |
| Rotary impeller | The actuator is connected to a rotary impeller. A small angular deflection of the actuator results in a rotation of the impeller vanes, which push the ink against stationary vanes and out of the nozzle. | High mechanical advantage The ratio of force to travel of the actuator can be matched to the nozzle requirements by varying the number of impeller vanes | Complex construction Unsuitable for pigmented inks | IJ28 |
| Acoustic lens | A refractive or diffractive (e.g. zone plate) acoustic lens is used to concentrate sound waves. | No moving parts | Large area required Only relevant for acoustic ink jets | 1993 Hadimioglu et al, EUP 550,192 1993 Elrod et al, EUP 572,220 |
| Sharp conductive point | A sharp point is used to concentrate an electrostatic field. | Simple construction | Difficult to fabricate using standard VLSI processes for a | Tone-jet |

-continued

| | Description | Advantages | Disadvantages | Examples |
|---|---|---|---|---|
| | | | surface ejecting ink-jet<br>Only relevant for electrostatic ink jets | |
| | | ACTUA2TOR MOTION | | |
| Volume expansion | The volume of the actuator changes, pushing the ink in all directions. | Simple construction in the case of thermal ink jet | High energy is typically required to achieve volume expansion. This leads to thermal stress, cavitation, and kogation in thermal ink jet implementations | Hewlett-Packard Thermal Ink jet Canon Bubblejet |
| Linear, normal to chip surface | The actuator moves in a direction normal to the print head surface. The nozzle is typically in the line of movement. | Efficient coupling to ink drops ejected normal to the surface | High fabrication complexity may be required to achieve perpendicular motion | IJ01, IJ02, IJ04, IJ07, IJ11, IJ14 |
| Parallel to chip surface | The actuator moves parallel to the print head surface. Drop ejection may still be normal to the surface. | Suitable for planar fabrication | Fabrication complexity<br>Friction<br>Stiction | IJ12, IJ13, IJ15, IJ33, , IJ34, IJ35, IJ36 |
| Membrane push | An actuator with a high force but small area is used to push a stiff membrane that is in contact with the ink. | The effective area of the actuator becomes the membrane area | Fabrication complexity<br>Actuator size<br>Difficulty of integration in a VLSI process | 1982 Howkins U.S. Pat. No. 4,459,601 |
| Rotary | The actuator causes the rotation of some element, such a grill or impeller | Rotary levers may be used to increase travel<br>Small chip area requirements | Device complexity<br>May have friction at a pivot point | IJ05, IJ08, IJ13, IJ28 |
| Bend | The actuator bends when energized. This may be due to differential thermal expansion, piezoelectric expansion, magnetostriction, or other form of relative dimensional change. | A very small change in dimensions can be converted to a large motion. | Requires the actuator to be made from at least two distinct layers, or to have a thermal difference across the actuator | 1970 Kyser et al U.S. Pat. No. 3,946,398<br>1973 Stemme U.S. Pat. No. 3,747,120<br>IJ03, IJ09, IJ10, IJ19, IJ23, IJ24, IJ25, IJ29, IJ30, IJ31, IJ33, IJ34, IJ35 |
| Swivel | The actuator swivels around a central pivot. This motion is suitable where there are opposite forces applied to opposite sides of the paddle, e.g. Lorenz force. | Allows operation where the net linear force on the paddle is zero<br>Small chip area requirements | Inefficient coupling to the ink motion | IJ06 |
| Straighten | The actuator is normally bent, and straightens when energized. | Can be used with shape memory alloys where the austenic phase is planar | Requires careful balance of stresses to ensure that the quiescent bend is accurate | IJ26, IJ32 |
| Double bend | The actuator bends in one direction when one element is energized, and bends the other way when another element is energized. | One actuator can be used to power two nozzles.<br>Reduced chip size.<br>Not sensitive to ambient temperature | Difficult to make the drops ejected by both bend directions identical.<br>A small efficiency loss compared to equivalent single bend actuators. | IJ36, IJ37, IJ38 |
| Shear | Energizing the actuator causes a shear motion in the actuator material. | Can increase the effective travel of piezoelectric actuators | Not readily applicable to other actuator mechanisms | 1985 Fishbeck U.S. Pat. No. 4,584,590 |
| Radial constriction | The actuator squeezes an ink reservoir, forcing ink from a | Relatively easy to fabricate single nozzles from glass | High force required<br>Inefficient | 1970 Zoltan U.S. Pat. No. 3,683,212 |

-continued

|  | Description | Advantages | Disadvantages | Examples |
|---|---|---|---|---|
| | constricted nozzle. | tubing as macroscopic structures | Difficult to integrate with VLSI processes | |
| Coil/uncoil | A coiled actuator uncoils or coils more tightly. The motion of the free end of the actuator ejects the ink. | Easy to fabricate as a planar VLSI process Small area required, therefore low cost | Difficult to fabricate for non-planar devices Poor out-of-plane stiffness | IJ17, IJ21, IJ34, IJ35 |
| Bow | The actuator bows (or buckles) in the middle when energized. | Can increase the speed of travel Mechanically rigid | Maximum travel is constrained High force required | IJ16, IJ18, IJ27 |
| Push-Pull | Two actuators control a shutter. One actuator pulls the shutter, and the other pushes it. | The structure is pinned at both ends, so has a high out-of-plane rigidity | Not readily suitable for ink jets which directly push the ink | IJ18 |
| Curl inwards | A set of actuators curl inwards to reduce the volume of ink that they enclose. | Good fluid flow to the region behind the actuator increases efficiency | Design complexity | IJ20, IJ42 |
| Curl outwards | A set of actuators curl outwards, pressurizing ink in a chamber surrounding the actuators, and expelling ink from a nozzle in the chamber. | Relatively simple construction | Relatively large chip area | IJ43 |
| Iris | Multiple vanes enclose a volume of ink. These simultaneously rotate, reducing the volume between the vanes. | High efficiency Small chip area | High fabrication complexity Not suitable for pigmented inks | IJ22 |
| Acoustic vibration | The actuator vibrates at a high frequency. | The actuator can be physically distant from the ink | Large area required for efficient operation at useful frequencies Acoustic coupling and crosstalk Complex drive circuitry Poor control of drop volume and position | 1993 Hadimioglu et al, EUP 550,192 1993 Elrod et al, EUP 572,220 |
| None | In various ink jet designs the actuator does not move. | No moving parts | Various other tradeoffs are required to eliminate moving parts | Silverbrook, EP 0771 658 A2 and related patent applications Tone-jet |

NOZZLE REFILL METHOD

|  | Description | Advantages | Disadvantages | Examples |
|---|---|---|---|---|
| Surface tension | This is the normal way that ink jets are refilled. After the actuator is energized, it typically returns rapidly to its normal position. This rapid return sucks in air through the nozzle opening. The ink surface tension at the nozzle then exerts a small force restoring the meniscus to a minimum area. This force refills the nozzle. | Fabrication simplicity Operational simplicity | Low speed Surface tension force relatively small compared to actuator force Long refill time usually dominates the total repetition rate | Thermal ink jet Piezoelectric ink jet IJ01–IJ07, IJ10–IJ14, IJ16, IJ20, IJ22–IJ45 |
| Shuttered oscillating ink pressure | Ink to the nozzle chamber is provided at a pressure that oscillates at twice the drop ejection frequency. When a drop is to be ejected, the shutter is opened for 3 half cycles: drop ejection, actuator | High speed Low actuator energy, as the actuator need only open or close the shutter, instead of ejecting the ink drop | Requires common ink pressure oscillator May not be suitable for pigmented inks | IJ08, IJ13, IJ15, IJ17, IJ18, IJ19, IJ21 |

|  | Description | Advantages | Disadvantages | Examples |
| --- | --- | --- | --- | --- |
|  | return, and refill. The shutter is then closed to prevent the nozzle chamber emptying during the next negative pressure cycle. |  |  |  |
| Refill actuator | After the main actuator has ejected a drop a second (refill) actuator is energized. The refill actuator pushes ink into the nozzle chamber. The refill actuator returns slowly, to prevent its return from emptying the chamber again. | High speed, as the nozzle is actively refilled | Requires two independent actuators per nozzle | IJ09 |
| Positive ink pressure | The ink is held a slight positive pressure. After the ink drop is ejected, the nozzle chamber fills quickly as surface tension and ink pressure both operate to refill the nozzle | High refill rate, therefore a high drop repetition rate is possible | Surface spill must be prevented Highly hydrophobic print head surfaces are required | Silverbrook, EP 0771 658 A2 and related patent applications Alternative for:, IJ01–IJ07, IJ10–IJ14, IJ16, IJ20, IJ22–IJ45 |
| METHOD OF RESTRICTING BACK-FLOW THROUGH INLET | | | | |
| Long inlet channel | The ink inlet channel to the nozzle chamber is made long and relatively narrow, relying on viscous drag to reduce inlet back-flow. | Design simplicity Operational simplicity Reduces crosstalk | Restricts refill rate May result in a relatively large chip area Only partially effective | Thermal ink jet Piezoelectric ink jet IJ42, IJ43 |
| Positive ink pressure | The ink is under a positive pressure, so that in the quiescent state some of the ink drop already protrudes from the nozzle. This reduces the pressure in the nozzle chamber which is required to eject a certain volume of ink. The reduction in chamber pressure results in a reduction in ink pushed out through the inlet. | Drop selection and separation forces can be reduced Fast refill time | Requires a method (such as a nozzle rim or effective hydrophobizing, or both) to prevent flooding of the ejection surface of the print head. | Silverbrook, EP 0771 658 A2 and related patent applications Possible operation of the following: IJ01–IJ07, IJ09–IJ12, IJ14, IJ16, IJ20, IJ22, , IJ23–IJ34, IJ36–IJ41, IJ44 |
| Baffle | One or more baffles are placed in the inlet ink flow. When the actuator is energized, the rapid ink movement creates eddies which restrict the flow through the inlet. The slower refill process is unrestricted, and does not result in eddies. | The refill rate is not as restricted as the long inlet method. Reduces crosstalk | Design complexity May increase fabrication complexity (e.g. Tektronix hot melt Piezoelectric print heads). | HP Thermal Ink Jet Tektronix piezoelectric ink jet |
| Flexible flap restricts inlet | In this method recently disclosed by Canon, the expanding actuator (bubble) pushes on a flexible flap that restricts the inlet. | Significantly reduces back-flow for edge-shooter thermal ink jet devices | Not applicable to most ink jet configurations Increased fabrication complexity Inelastic deformation of polymer flap results in creep over extended use | Canon |
| Inlet filter | A filter is located between the ink inlet and the nozzle | Additional advantage of ink filtration | Restricts refill rate May result in | IJ04, IJ12, IJ24, IJ27, IJ29, IJ30 |

-continued

| | Description | Advantages | Disadvantages | Examples |
|---|---|---|---|---|
| | chamber. The filter has a multitude of small holes or slots, restricting ink flow. The filter also removes particles which may block the nozzle. | Ink filter may be fabricated with no additional process steps | complex construction | |
| Small inlet compared to nozzle | The ink inlet channel to the nozzle chamber has a substantially smaller cross section than that of the nozzle, resulting in easier ink egress out of the nozzle than out of the inlet. | Design simplicity | Restricts refill rate May result in a relatively large chip area Only partially effective | IJ02, IJ37, IJ44 |
| Inlet shutter | A secondary actuator controls the position of a shutter, closing off the ink inlet when the main actuator is energized. | Increases speed of the ink-jet print head operation | Requires separate refill actuator and drive circuit | IJ09 |
| The inlet is located behind the ink-pushing surface | The method avoids the problem of inlet back-flow by arranging the ink-pushing surface of the actuator between the inlet and the nozzle. | Back-flow problem is eliminated | Requires careful design to minimize the negative pressure behind the paddle | IJ01, IJ03, IJ05, IJ06, IJ07, IJ10, IJ11, IJ14, IJ16, IJ22, IJ23, IJ25, IJ28, IJ31, IJ32, IJ33, IJ34, IJ35, IJ36, IJ39, IJ40, IJ41 |
| Part of the actuator moves to shut off the inlet | The actuator and a wall of the ink chamber are arranged so that the motion of the actuator closes off the inlet. | Significant reductions in back-flow can be achieved Compact designs possible | Small increase in fabrication complexity | IJ07, IJ20, IJ26, IJ38 |
| Nozzle actuator does not result in ink back-flow | In some configurations of ink jet, there is no expansion or movement of an actuator which may cause ink back-flow through the inlet. | Ink back-flow problem is eliminated | None related to ink back-flow on actuation | Silverbrook, EP 0771 658 A2 and related patent applications Valve-jet Tone-jet |
| | | NOZZLE CLEARING METHOD | | |
| Normal nozzle firing | All of the nozzles are fired periodically, before the ink has a chance to dry. When not in use the nozzles are sealed (capped) against air. The nozzle firing is usually performed during a special clearing cycle, after first moving the print head to a cleaning station. | No added complexity on the print head | May not be sufficient to displace dried ink | Most ink jet systems IJ01, IJ02, IJ03, IJ04, IJ05, IJ06, IJ07, IJ09, IJ10, IJ11, IJ12, IJ14, IJ16, IJ20, IJ22, IJ23, IJ24, IJ25, IJ26, IJ27, IJ28, IJ29, IJ30, IJ31, IJ32, IJ33, IJ34, IJ36, IJ37, IJ38, IJ39, IJ40,, IJ41, IJ42, IJ43, IJ44,, IJ45 |
| Extra power to ink heater | In systems which heat the ink, but do not boil it under normal situations, nozzle clearing can be achieved by over-powering the heater and boiling ink at the nozzle. | Can be highly effective if the heater is adjacent to the nozzle | Requires higher drive voltage for clearing May require larger drive transistors | Silverbrook, EP 0771 658 A2 and related patent applications |
| Rapid success-ion of actuator pulses | The actuator is fired in rapid succession. In some configurations, this may cause heat build-up at the nozzle which boils the ink, clearing the nozzle. In other situations, it may cause sufficient | Does not require extra drive circuits on the print head Can be readily controlled and initiated by digital logic | Effectiveness depends substantially upon the configuration of the ink jet nozzle | May be used with: IJ01, IJ02, IJ03, IJ04, IJ05, IJ06, IJ07, IJ09, IJ10, IJ11, IJ14, IJ16, IJ20, IJ22, IJ23, IJ24, IJ25, IJ27, IJ28, IJ29, IJ30, IJ31, IJ32, |

|  | Description | Advantages | Disadvantages | Examples |
| --- | --- | --- | --- | --- |
| | vibrations to dislodge clogged nozzles. | | | IJ33, IJ34, IJ36, IJ37, IJ38, IJ39, IJ40, IJ41, IJ42, IJ43, IJ44, IJ45 |
| Extra power to ink pushing actuator | Where an actuator is not normally driven to the limit of its motion, nozzle clearing may be assisted by providing an enhanced drive signal to the actuator. | A simple solution where applicable | Not suitable where there is a hard limit to actuator movement | May be used with: IJ03, IJ09, IJ16, IJ20, IJ23, IJ24, IJ25, IJ27, IJ29, IJ30, IJ31, IJ32, IJ39, IJ40, IJ41, IJ42, IJ43, IJ44, IJ45 |
| Acoustic resonance | An ultrasonic wave is applied to the ink chamber. This wave is of an appropriate amplitude and frequency to cause sufficient force at the nozzle to clear blockages. This is easiest to achieve if the ultrasonic wave is at a resonant frequency of the ink cavity. | A high nozzle clearing capability can be achieved May be implemented at very low cost in systems which already include acoustic actuators | High implementation cost if system does not already include an acoustic actuator | IJ08, IJ13, IJ15, IJ17, IJ18, IJ19, IJ21 |
| Nozzle clearing plate | A microfabricated plate is pushed against the nozzles. The plate has a post for every nozzle. A post moves through each nozzle, displacing dried ink. | Can clear severely clogged nozzles | Accurate mechanical alignment is required Moving parts are required There is risk of damage to the nozzles Accurate fabrication is required | Silverbrook, EP 0771 658 A2 and related patent applications |
| Ink pressure pulse | The pressure of the ink is temporarily increased so that ink streams from all of the nozzles. This may be used in conjunction with actuator energizing. | May be effective where other methods cannot be used | Requires pressure pump or other pressure actuator Expensive Wasteful of ink | May be used with all IJ series ink jets |
| Print head wiper | A flexible 'blade' is wiped across the print head surface. The blade is usually fabricated from a flexible polymer, e.g. rubber or synthetic elastomer. | Effective for planar print head surfaces Low cost | Difficult to use if print head surface is non-planar or very fragile Requires mechanical parts Blade can wear out in high volume print systems | Many ink jet systems |
| Separate ink boiling heater | A separate heater is provided at the nozzle although the normal drop e-ection mechanism does not require it. The heaters do not require individual drive circuits, as many nozzles can be cleared simultaneously, and no imaging is required. | Can be effective where other nozzle clearing methods cannot be used Can be implemented at no additional cost in some ink jet configurations | Fabrication complexity | Can be used with many IJ series ink jets |

NOZZLE PLATE CONSTRUCTION

|  | Description | Advantages | Disadvantages | Examples |
| --- | --- | --- | --- | --- |
| Electroformed nickel | A nozzle plate is separately fabricated from electroformed nickel, and bonded to the print head chip. | Fabrication simplicity | High temperatures and pressures are required to bond nozzle plate Minimum thickness constraints Differential thermal expansion | Hewlett Packard Thermal Ink jet |

-continued

| | Description | Advantages | Disadvantages | Examples |
|---|---|---|---|---|
| Laser ablated or drilled polymer | Individual nozzle holes are ablated by an intense UV laser in a nozzle plate, which is typically a polymer such as polyimide or polysulphone | No masks required Can be quite fast Some control over nozzle profile is possible Equipment required is relatively low cost | Each hole must be individually formed Special equipment required Slow where there are many thousands of nozzles per print head May produce thin burrs at exit holes | Canon Bubblejet 1988 Sercel et al., SPIE, Vol. 998 Excimer Beam Applications, pp. 76–83 1993 Watanabe et al., U.S. Pat. No. 5,208,604 |
| Silicon micromachined | A separate nozzle plate is micromachined from single crystal silicon, and bonded to the print head wafer. | High accuracy is attainable | Two part construction High cost Requires precision alignment Nozzles may be clogged by adhesive | K. Bean, IEEE Transactions on Electron Devices, Vol. ED-25, No. 10, 1978, pp 1185–1195 Xerox 1990 Hawkins et al., U.S. Pat. No. 4,899,181 |
| Glass capillaries | Fine glass capillaries are drawn from glass tubing. This method has been used for making individual nozzles, but is difficult to use for bulk manufacturing of print heads with thousands of nozzles. | No expensive equipment required Simple to make single nozzles | Very small nozzle sizes are difficult to form Not suited for mass production | 1970 Zoltan U.S. Pat. No. 3,683,212 |
| Monolithic, surface micromachined using VLSI lithographic processes | The nozzle plate is deposited as a layer using standard VLSI deposition techniques. Nozzles are etched in the nozzle plate using VLSI lithography and etching. | High accuracy ($<1\,\mu m$) Monolithic Low cost Existing processes can be used | Requires sacrificial layer under the nozzle plate to form the nozzle chamber Surface may be fragile to the touch | Silverbrook, EP 0771 658 A2 and related patent applications IJ01, IJ02, IJ04, IJ11, IJ12, IJ17, IJ18, IJ20, IJ22, IJ24, IJ27, IJ28, IJ29, IJ30, IJ31, IJ32, IJ33, IJ34, IJ36, IJ37, IJ38, IJ39, IJ40, IJ41, IJ42, IJ43, IJ44 |
| Monolithic, etched through substrate | The nozzle plate is a buried etch stop in the wafer. Nozzle chambers are etched in the front of the wafer, and the wafer is thinned from the back side. Nozzles are then etched in the etch stop layer. | High accuracy ($<1\,\mu m$) Monolithic Low cost No differential expansion | Requires long etch times Requires a support wafer | IJ03, IJ05, IJ06, IJ07, IJ08, IJ09, IJ10, IJ13, IJ14, IJ15, IJ16, IJ19, IJ21, IJ23, IJ25, IJ26 |
| No nozzle plate | Various methods have been tried to eliminate the nozzles entirely, to prevent nozzle clogging. These include thermal bubble mechanisms and acoustic lens mechanisms | No nozzles to become clogged | Difficult to control drop position accurately Crosstalk problems | Ricoh 1995 Sekiya et al U.S. Pat. No. 5,412,413 1993 Hadimioglu et al EUP 550,192 1993 Elrod et al EUP 572,220 |
| Trough | Each drop ejector has a trough through which a paddle moves. There is no nozzle plate. | Reduced manufacturing complexity Monolithic | Drop firing direction is sensitive to wicking. | IJ35 |
| Nozzle slit instead of individual nozzles | The elimination of nozzle holes and replacement by a slit encompassing many actuator positions reduces nozzle clogging, but increases crosstalk due to ink surface waves | No nozzles to become clogged | Difficult to control drop position accurately Crosstalk problems | 1989 Saito et al U.S. Pat. No. 4,799,068 |

|   | Description | Advantages | Disadvantages | Examples |
| --- | --- | --- | --- | --- |
| DROP EJECTION DIRECTION | | | | |
| Edge ('edge shooter') | Ink flow is along the surface of the chip, and ink drops are ejected from the chip edge. | Simple construction No silicon etching required Good heat sinking via substrate Mechanically strong Ease of chip handing | Nozzles limited to edge High resolution is difficult Fast color printing requires one print head per color | Canon Bubblejet 1979 Endo et al GB patent 2,007,162 Xerox heater-in-pit 1990 Hawkins et al U.S. Pat. No. 4,899,181 Tone-jet |
| Surface ('roof shooter') | Ink flow is along the surface of the chip, and ink drops are ejected from the chip surface, normal to the plane of the chip. | No bulk silicon etching required Silicon can make an effective heat sink Mechanical strength | Maximum ink flow is severely restricted | Hewlett-Packard TIJ 1982 Vaught et al U.S. Pat. No. 4,490,728 IJ02, IJ11, IJ12, IJ20, IJ22 |
| Through chip, forward ('up shooter') | Ink flow is through the chip, and ink drops are ejected from the front surface of the chip. | High ink flow Suitable for pagewidth print heads High nozzle packing density therefore low manufacturing cost | Requires bulk silicon etching | Silverbrook, EP 0771 658 A2 and related patent applications IJ04, IJ17, IJ18, IJ24, IJ27–IJ45 |
| Through chip, reverse ('down shooter') | Ink flow is through the chip, and ink drops are ejected from the rear surface of the chip. | High ink flow Suitable for pagewidth print heads High nozzle packing density therefore low manufacturing cost | Requires wafer thinning Requires special handling during manufacture | IJ01, IJ03, IJ05, IJ06, IJ07, IJ08, IJ09, IJ10, IJ13, IJ14, IJ15, 1116, IJ19, IJ21, IJ23, IJ25, IJ26 |
| Through actuator | Ink flow is through the actuator, which is not fabricated as part of the same substrate as the drive transistors. | Suitable for piezoelectric print heads | Pagewidth print heads require several thousand connections to drive circuits Cannot be manufactured in standard CMOS fabs Complex assembly required | Epson Stylus Tektronix hot melt piezoelectric ink jets |
| INK TYPE | | | | |
| Aqueous, dye | Water based ink which typically contains: water, dye, surfactant, humectant, and biocide. Modern ink dyes have high water-fastness, light fastness | Environmentally friendly No odor | Slow drying Corrosive Bleeds on paper May strikethrough Cockles paper | Most existing ink jets All IJ series ink jets Silverbrook, EP 0771 658 A2 and related patent applications |
| Aqueous, pigment | Water based ink which typically contains: water, pigment, surfactant, humectant, and biocide. Pigments have an advantage in reduced bleed, wicking and strikethrough. | Environmentally friendly No odor Reduced bleed Reduced wicking Reduced strikethrough | Slow drying Corrosive Pigment may clog nozzles Pigment may clog actuator mechanisms Cockles paper | IJ02, IJ04, IJ21, IJ26, IJ27, IJ30 Silverbrook, EP 0771 658 A2 and related patent applications Piezoelectric ink-jets Thermal ink jets (with significant restrictions) |
| Methyl Ethyl Ketone (MEK) | MEK is a highly volatile solvent used for industrial printing on difficult surfaces such as aluminum cans. | Very fast drying Prints on various substrates such as metals and plastics | Odorous Flammable | All IJ series ink jets |
| Alcohol (ethanol, 2-butanol, and others) | Alcohol based inks can be used where the printer must operate at temperatures below the freezing point of | Fast drying Operates at sub-freezing temperatures Reduced paper | Slight odor Flammable | All IJ series ink jets |

-continued

| | Description | Advantages | Disadvantages | Examples |
|---|---|---|---|---|
| | water. An example of this is in-camera consumer photographic printing. | cockle Low cost | | |
| Phase change (hot melt) | The ink is solid at room temperature, and is melted in the print head before jetting. Hot melt inks are usually wax based, with a melting point around 80° C.. After jetting the ink freezes almost instantly upon contacting the print medium or a transfer roller. | No drying time- ink instantly freezes on the print medium Almost any print medium can be used No paper cockle occurs No wicking occurs No bleed occurs No strikethrough occurs | High viscosity Printed ink typically has a 'waxy' feel Printed pages may 'block' Ink temperature may be above the curie point of permanent magnets Ink heaters consume power Long warm-up time | Tektronix hot melt piezoelectric ink jets 1989 Nowak U.S. Pat. No. 4,820,346 All IJ series ink jets |
| Oil | Oil based inks are extensively used in offset printing. They have advantages in improved characteristics on paper (especially no wicking or cockle). Oil soluble dies and pigments are required. | High solubility medium for some dyes Does not cockle paper Does not wick through paper | High viscosity: this is a significant limitation for use in ink jets, which usually require a low viscosity. Some short chain and multi-branched oils have a sufficiently low viscosity. Slow drying | All IJ series ink jets |
| Microemulsion | A microemulsion is a stable, self forming emulsion of oil, water, and surfactant. The characteristic drop size is less than 100 nm, and is determined by the preferred curvature of the surfactant. | Stops ink bleed High dye solubility Water, oil, and amphiphilic soluble dies can be used Can stabilize pigment suspensions | Viscosity higher than water Cost is slightly higher than water based ink High surfactant concentration required (around 5%) | All IJ series ink jets |

I claim:

1. A micro-electromechanical valve assembly for controlling a flow of fluid through a fluid supply channel defined in a wafer substrate and drive circuitry layers positioned on the wafer substrate and terminating at a fluid supply opening, the valve assembly comprising;

an elongate actuator that is anchored at one end to the wafer substrate to be in electrical contact with the drive circuitry layers; and a closure member that is mounted on an opposite end of the elongate actuator, the actuator being configured to receive an electrical signal from the drive circuitry layer to displace the closure member between a closed position in which the closure member covers the fluid supply opening and ink is inhibited from flowing through the fluid supply channel and an open position, wherein the elongate actuator is shaped so that, in a rest condition, the actuator encloses an arc, the actuator including a heating portion that is capable of being heated on receipt of the electrical signal to expand, the heating portion being configured so that, when the portion is heated, the resultant expansion of the portion causes the actuator to straighten at least partially and a subsequent cooling of the portion causes the actuator to return to its rest condition thereby displacing the closure between the closed and open positions.

2. A valve assembly as claimed in claim 1, in which each actuator includes a body portion that is of a resiliently flexible material having a coefficient of thermal expansion which is such that the material can expand to perform work when heated, the heating portion being positioned in the body portion and defining a heating circuit of a suitable metal.

3. A valve assembly as claimed in claim 2, in which the heating circuit includes a heater and a return trace, the heater being positioned proximate an inside edge of the body portion and the return trace being positioned outwardly of the heater, so that an inside region of the body portion is heated to a relatively greater extent with the result that the inside region expands to a greater extent than a remainder of the body portion.

4. A valve assembly as claimed in claim 3, in which a serpentine length of said suitable material defines the heater.

5. A valve assembly as claimed in claim 3, in which the body portion is of polytetrafluoroethylene and the heating circuit is of copper.

6. A valve assembly as claimed in claim 1, in which each actuator defines a coil that partially uncoils when the heating portion expands.

* * * * *